(12) United States Patent
Hay et al.

(10) Patent No.: US 11,816,090 B2
(45) Date of Patent: Nov. 14, 2023

(54) SELECTIVELY PROCESSING AN EVENT PUBLISHED RESPONSIVE TO AN OPERATION ON A DATABASE RECORD THAT RELATES TO CONSENT

(71) Applicant: Salesforce, Inc., San Francisco, CA (US)

(72) Inventors: Marla Hay, Portland, OR (US); Yvonne Zhou, San Francisco, CA (US); Yu Chen, Bellevue, WA (US); Shivan Kaul Sahib, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 112 days.

(21) Appl. No.: 16/777,858

(22) Filed: Jan. 30, 2020

(65) Prior Publication Data

US 2021/0149874 A1 May 20, 2021

Related U.S. Application Data

(60) Provisional application No. 62/937,105, filed on Nov. 18, 2019.

(51) Int. Cl.
*G06F 16/23* (2019.01)
*G06Q 10/10* (2023.01)

(52) U.S. Cl.
CPC ......... *G06F 16/2365* (2019.01); *G06Q 10/10* (2013.01)

(58) Field of Classification Search
None
See application file for complete search history.

(56) References Cited

U.S. PATENT DOCUMENTS

| 7,730,478 | B2 | 6/2010 | Weissman | |
|---|---|---|---|---|
| 9,690,820 | B1* | 6/2017 | Girulat, Jr. | ............. G06Q 40/02 |
| 10,740,475 | B2 | 8/2020 | Eidson et al. | |
| 2009/0132395 | A1* | 5/2009 | Lam | .................... G06F 16/9535 |
| | | | | 705/30 |
| 2012/0023077 | A1* | 1/2012 | Kann | .................... G06F 16/275 |
| | | | | 707/E17.005 |
| 2012/0223951 | A1* | 9/2012 | Dunn | ...................... H04L 51/52 |
| | | | | 345/467 |
| 2014/0019335 | A1* | 1/2014 | Macdonald | ............ G06Q 30/06 |
| | | | | 705/39 |
| 2017/0091388 | A1* | 3/2017 | Zolla | ...................... G06F 16/254 |
| 2017/0134243 | A1* | 5/2017 | Levesque | ................ H04L 41/22 |
| 2019/0147079 | A1* | 5/2019 | Nikitina | .............. G06F 16/2315 |
| | | | | 707/703 |
| 2019/0340388 | A1 | 11/2019 | Eidson et al. | |
| 2019/0342088 | A1 | 11/2019 | Eidson | |

(Continued)

*Primary Examiner* — Irene Baker
(74) *Attorney, Agent, or Firm* — Nicholson, De Vos, Webster & Elliott, LLP

(57) ABSTRACT

Implementations retrieve a first event that published to a first source of events responsive to updating, deleting, or inserting a first record in a database object that stores records relating to consent. The first event is processed. Processing the first event includes storing in an attribute of a second event an identifier for a second record that relates to the first record and that is in a second database object that stores records relating to consent. If the first record was inserted or updated, processing the first event includes storing in an attribute of the second event one or more identifiers and respective values of fields of the first record based on attributes of the first event.

22 Claims, 10 Drawing Sheets

(56) References Cited

U.S. PATENT DOCUMENTS

2020/0097574 A1  3/2020  Hay
2020/0097680 A1  3/2020  Hay
2020/0364224 A1  11/2020 Hay et al.
2020/0364669 A1  11/2020 Hay et al.

* cited by examiner

SELECTIVELY PROCESSING AN EVENT PUBLISHED RESPONSIVE TO AN OPERATION ON A DATABASE RECORD THAT RELATES TO CONSENT

CROSS-REFERENCE TO RELATED APPLICATIONS

This application claims the benefit of U.S. Provisional Application No. 62/937,105, filed Nov. 18, 2019, which is hereby incorporated by reference.

TECHNICAL FIELD

One or more implementations relate to the field of processing events that relate to consent; and more specifically, to selectively processing an event published responsive to a change in consent.

BACKGROUND ART

Data privacy laws and regulations are proliferating, especially in the area of consent. Data privacy laws and regulations may restrict, amongst other things, the collection, disclosure, and/or use of information pertaining to a person (e.g., a natural person and/or a legal person). Data privacy laws may require a person's consent before an entity performs an action relative to the person. In this context, a value that relates to consent (also referred to as a consent value) is an electronic record of a person's manifestation of consent to an act, such as a record of a person's assent to being contacted for marketing purposes.

Typically, an entity will store values that relate to consent in a database (DB). Specifically, one or more records may be associated with consent values and those records are stored in one or more database objects (each, a DBO). A record that relates to consent is a record that 1) includes a field for storing a consent value or 2) includes data to which a consent value corresponds. For example, a record relating to consent may include 1) a field for storing a value that relates to whether a person has consented to communication by email, and/or 2) a field for storing an email address to which the former value corresponds.

A database may comprise one or more database objects that are managed by a database management system (DBMS), each database object may include a set of records, and each record may comprise a set of fields. A record may take different forms based on the database model being used and/or the specific database object to which the record belongs (e.g., a record may be: 1) a row in a table of a relational database; 2) a JavaScript Object Notation (JSON) object; 3) an Extensible Markup Language (XML) document; 4) a key-value pair; etc.). A database object can be unstructured or have a structure defined by the DBMS and/or defined by a user. In some implementations of a cloud database (a database that runs on a cloud platform and that is provided as a database service), identifiers are used instead of database keys, and relationships are used instead of foreign keys.

While implementations may use one or more types of databases, a relational database with tables is sometimes described to simplify understanding. In a relational database management system (RDBMS), each relational database table (which is a type of database object) generally contains one or more data categories logically arranged as columns according to a schema, where the columns of the relational database table are different ones of the fields from the plurality of records, and where rows of the relational database table are different ones of a plurality of records and each contains an instance of data for each category defined by the fields. Thus, the fields of a record are defined by the structure of the database object to which the field belongs. By way of example, a customer relationship management (CRM) database may include a table that describes a customer with fields for contact information such as name, address, phone number, email, etc. The database may also contain tables with records associated with consent values for persons belonging to that customer.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for selectively processing an event published responsive to updating, inserting, or deleting a record that relates to consent.

Some systems may publish an event responsive to updating, deleting, or inserting a record in a database object. An event is any identifiable unit of data that conveys information about an occurrence, operation, or entity in a computing system, and a topic is a common characteristic or identifier of events of a particular type. For example, an event may convey that a record of a database has been updated, deleted, or inserted. Typically, an event includes one or more attributes. An attribute (also referred to as a field) of an event is a part of an event that may contain one or more values; in one implementation, an attribute comprises an identifier and one or more values associated with that identifier. The attributes included in an event can be referred to as a payload (and may or may not include an identifier (ID) for a topic (also referred to as a topic ID) and other attributes). Publishing an event means making the event available in a source of events, which is a source of data from which an event can be read (e.g., a datastore, a database, a message bus, an event bus, a stream, a cache, etc.).

Figure 1A:
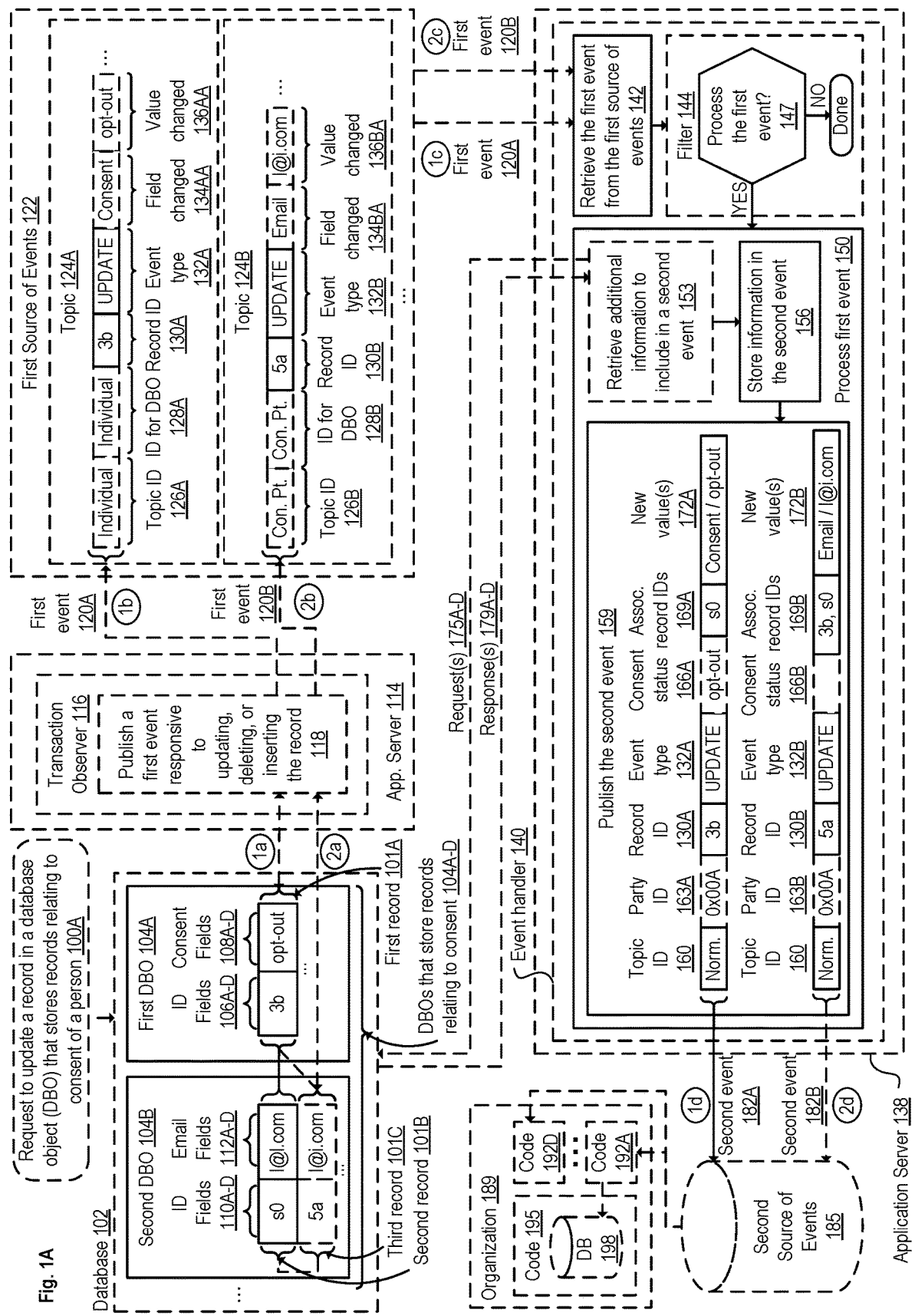
FIG. 1A is a block diagram that shows a system for selectively processing an event published responsive to updating a record that relates to consent, according to some example implementations.

FIG. 1A is a block diagram that shows a system for selectively processing an event published responsive to updating a record that relates to consent, according to some example implementations. FIG. 1A shows database 102, application server 114, a first source of events 122, an application server 138, and a second source of events 185.

Figure 3A:
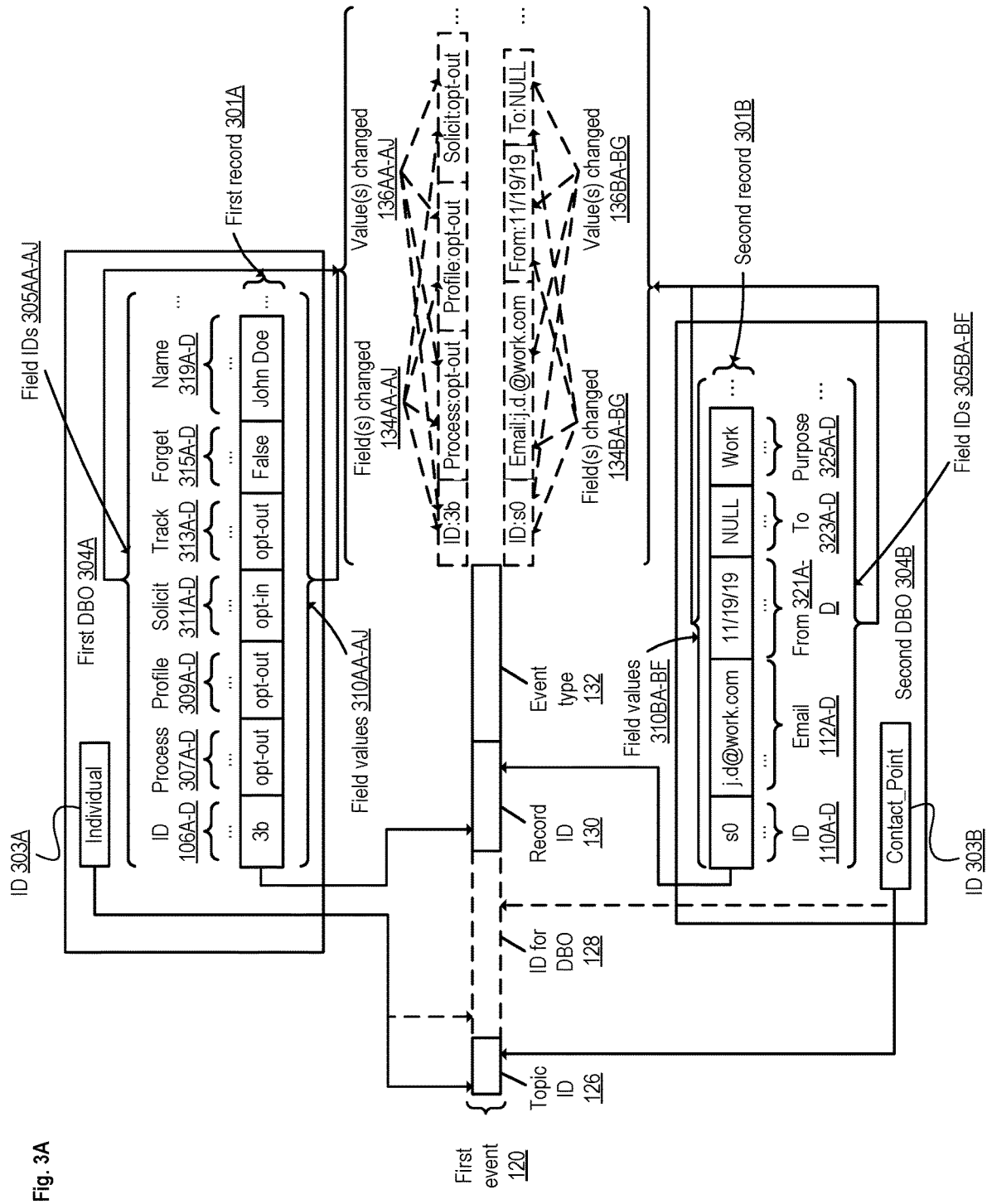
FIG. 3A is a diagram that shows a mapping between a record that relates to consent and an event published responsive to updating, inserting, or deleting such a record, according to some example implementations.

Database 102 includes database object (DBOs) 104A-D that store records relating to consent, including a first DBO 104A and a second DBO 104B. The first DBO 104A includes identifier (ID) fields 106A-D and consent fields 108A-D. The second DBO 104B includes ID fields 110A-D and email fields 112A-D. The fields shown in the first DBO 104A and second DBO 104B are exemplary and not limiting. For example, a DBO 104 that stores records 101 relating to consent may include different fields (e.g., as shown in FIG. 3A).

Responsive to database 102 receiving a request to update a record in a DBO 104 that stores records 101 relating to consent of a person 100A, a value that relates to consent is updated. For example, first record 101A in first DBO 104A is updated such that consent field 108A includes the updated value "opt-out." In some implementations described herein, the person to which consent relates is a natural person (i.e., an individual). In other implementations, the person can be replaced with a user (i.e., an organization or entity associated with an electronic device), such as if the user is or acting on behalf of a natural person or legal entity. In the example shown in FIG. 1A, first record 101A also includes ID field 106A, which stores the value "3b." At time 1a (indicated by circled reference "1a"), the change to first record 101A is indicated to application server 114.

Indicating the change to first record 101A to application server 114 is performed in different ways in different implementations. In one implementation, database 102 is configured to indicate the change to application server 114. For example, database 102 may include a database trigger that is executed responsive to updating, inserting, or deleting a record (e.g., first record 101A) in first DBO 104A and executing the database trigger causes code in application server 114 to be called or executed (i.e., a push mechanism). In another implementation, application server 114 may monitor database 102 such that application server 114 detects when a record in first DBO 104A is updated, inserted, or deleted (i.e., a pull mechanism). For example, application server 114 may include a transaction observer (e.g., transaction observer 116) that is called responsive to a change in state of a transaction (e.g., the transaction being committed), where the transaction includes updating, inserting, or deleting a record in first DBO 104A.

Responsive to updating, deleting, or inserting the record, in block 118, a first event is published. Specifically, at time 1b (indicated with circled reference "1b"), first event 120A is published to first source of events 122 responsive to updating first record 101A.

As shown in the first source of events 122, first event 120A is associated with topic 124A. An event can be associated with a topic in different ways. In one implementation, an event can be associated with a topic in part by including an identifier for the topic in the event. The topic ID may be included in the payload and/or in a header of the event. In another implementation, an event can be associated with a topic without including an identifier for the topic in the event. For example, an event may be published by calling an application programming interface (API) endpoint with the event (or data comprising the event) and the identifier for the topic with which the event is to be associated.

In some implementations, the topic with which the first event 120 is associated is identified by an identifier for the DBO in which the record was updated, deleted, or inserted. For example, topic ID 126A of first event 120A has the value "Individual"; this topic ID corresponds to an identifier (e.g., a name) of the first DBO 104A in some implementations. In such implementations, including an identifier for the DBO (e.g., ID for DBO 128) in which the record was updated, deleted, or inserted may be unnecessary (e.g., because that identifier is reflected in the topic ID). Other implementations use different approaches for identifying the topic with which the first event is associated. For example, a first event 120 might be associated with an identifier for database 102, or with an identifier that describes the DBO in which the record was updated, deleted, or inserted, etc.

As shown in FIG. 1A, first event 120A may include various items of data: topic ID 126A (with value "Individual"); an ID for DBO 128A (with value "Individual"); a record ID 130A (with value "3b") which corresponds to an ID for the record that was updated, deleted, or inserted; and an event type 132A (with value "UPDATE") which indicates whether the record was updated, deleted, or inserted (in this case, updated). First event 120A optionally includes field changed 134AA (with value "Consent"), which indicates a field of the record that was updated, and value changed 136AA (with value "opt-out"), which indicates the updated value of that field.

A first event, such as first event 120A, may include other items of data; e.g., one or more of 1) a timestamp corresponding to when the record was updated, deleted, or inserted; 2) a timestamp corresponding to when the transaction that included the update, deletion, or insertion was started; 3) a timestamp corresponding to when that transaction was committed; 4) a commit ID for the transaction; 5) information about the source of the change of consent (e.g., an address of a website from which a user submitted a request to change a consent value; an email address or telephone number from which a user submitted such a request; the name and/or employee ID of a customer service representative who processed the request; etc.); 6) a type of source of the change of consent (e.g., mail, website, telephone, email, short message service, etc.); 7) a timestamp corresponding to when a request to change a consent value was received from or on behalf of the person to whom the consent value relates (e.g., by a customer service representative, a system for capturing such requests (e.g., via email, via one or more webpages, etc.)); etc. Moreover, a first event, such as first event 120A, may include information on one or more additional fields that were updated in the first record (if updated) or that are included in the record (if inserted), and those fields' values.

Information is stored differently in the first and second events in different implementations. For example, one or more items of data might be stored in respective attributes of the first event 120, in a header of the first event 120, and/or combined in fewer attributes than the items of data (e.g., the value "Consent" of field changed 134AA and the value "opt-out" of value changed 136AA might be combined in a single attribute with the value "Consent/opt-out" or similar). Also, names of attributes in the first event 120 and second event 182 may differ in different implementations. For example, in one implementation, field changed 134AA may be an attribute in first event 120A and 1) a name of that attribute may be the value of field changed 134AA (i.e., "Consent") or based on that value, 2) a value of that attribute may be the corresponding value of value changed 136AA (i.e., "opt-out"), and 3) first event 120A might not include a separate attribute for value changed 136AA. In another implementation, field changed 134AA may be an attribute in first event 120A and 1) a name of that attribute may be a generic name (e.g., "field1"), 2) a value of that attribute may be the corresponding value of field changed 134AA (i.e., "Consent"), and 3) value changed 136AA may be another attribute in first event 120A with a generic name (e.g., "value1") and the value of value changed 136AA (i.e., "opt-out").

When first event 120A has been published to the first source of events 122, first event 120A can be read from the first source of events. FIG. 1A shows application server 138 which includes event handler 140. Event handler 140 includes blocks 142, 144, and 150. In block 142, first event 120A is retrieved from the first source of events 122.

In implementations based on a publish-subscribe messaging system, event handler 140 subscribes to a topic to receive events published to the first source of events 122 that are associated with that topic. For example, in such implementations, event handler 140 may subscribe to topic 124A and topic 124A to receive events associated with topic 124A and topic 124B from the first source of events 122. In some implementations, event handler 140 is notified when a first event 120 that is associated with one of these topics (to which the event handler has subscribed) is published to the first source of events 122, and event handler 140 can then retrieve the first event 120. In other implementations, a first event 120 is pushed to event handler 140; e.g., by calling block 142. Additionally or alternatively, event handler 140 can poll the first source of events 122 (e.g., at predefined intervals) to determine whether a first event 120 has been published. These techniques are exemplary and not limiting. For example, implementations may be based on message queueing, and thus publishing a first event 120 might include publishing the event to a message queue read by event handler 140. Alternatively, a first event 120 may be broadcast to a channel and read by event handler 140 connected to the channel. Rather than use a first source of events 122 that supports multiple topics (e.g., topic 124A, topic 124B, etc.), some implementations may use a different configuration; e.g., a source of events per topic.

From block 142, flow passes to block 144 in which the first event is optionally filtered. Some implementations might not perform filtering. For example, an implementation might publish a second event 182 for each first event 120 corresponding to updating, deleting, or inserting a record 101 in a database object 104 that stores records relating to consent; e.g., because all of the fields of database object 104 store values that relate to consent. Other implementations might perform filtering. A first event 120 that is retrieved in block 142 may be filtered in the sense that, in some implementations, the first event 120 is retrieved if it is associated with a topic that relates to the first DBO 104A, to the second DBO 104B, or more generally, to one of the DBOs that store records relating to consent 104A-D. For example, in some implementations, the event handler 140 only subscribes to topics that relate to DBOs that store records relating to consent 104A-D, and thus does not retrieve events that relate to other DBOs 104. Therefore, some filtering may optionally occur in block 142.

Figure 2A:
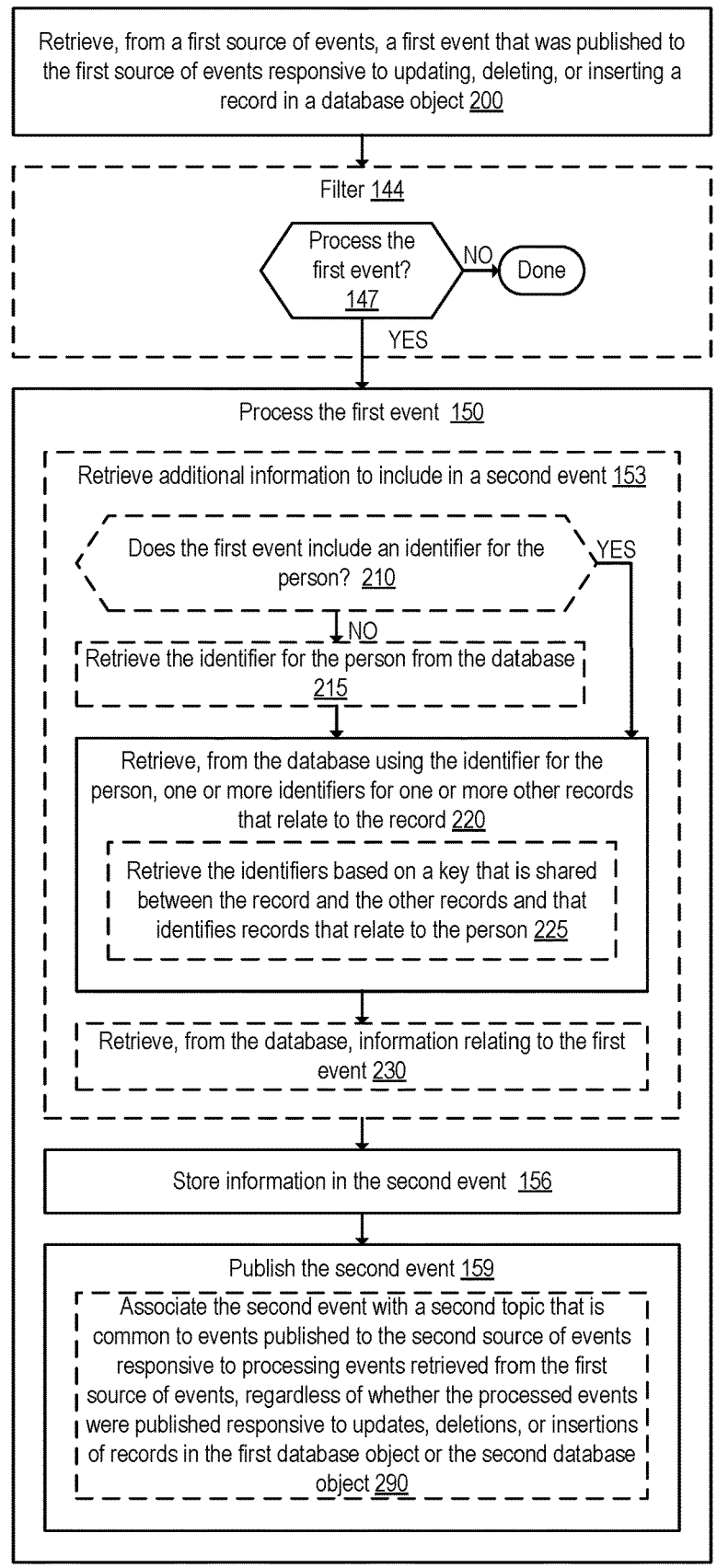
FIG. 2A is a flow diagram that shows a method for selectively processing an event published responsive to updating, inserting, or deleting a record that relates to consent, according to some example implementations.
Figure 2B:
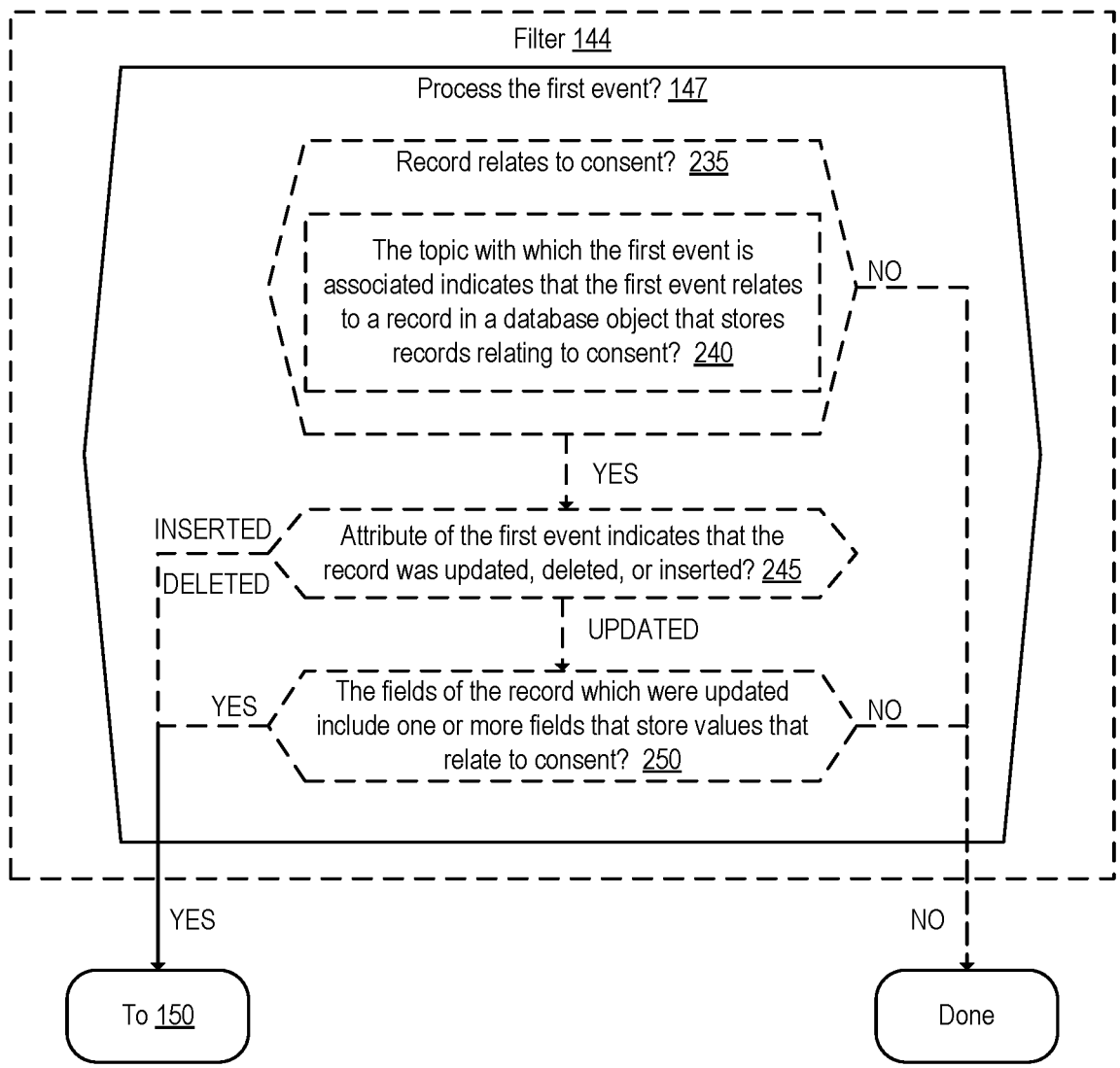
FIG. 2B is a flow diagram that shows a method for filtering an event published responsive to updating, inserting, or deleting a record that relates to consent, according to some example implementations.

Additionally or alternatively, filtering may be performed in other ways in block 147, some of which are described referring to FIG. 2B. For example, an implementation might perform filtering because less than all fields of a database object that stores records relating to consent 104 store values that relate to consent. For example, a database object that stores records relating to consent 104 may include a field that stores a person's ethnicity. If only the field that stores a person's ethnicity is updated, processing a first event 120 responsive to that update may be unnecessary. Additionally or alternatively, some fields in a database object that stores records relating to consent 104 might store values that may or may not relate to consent. For example, first DBO 104A may include a field that stores a person's age (not shown in FIG. 1A). The person's age might be relevant to consent; e.g., if the person is a minor. However, the person's age might be irrelevant to consent; e.g., when the person is of majority. If the field that stores a person's age is updated and the person's age is irrelevant to consent, processing the first event 120, including publishing a second event 182 based thereon, may be unnecessary. Thus, filtering a first event 120 to determine if the first event 120 should be processed may be desirable and provide advantages such as avoiding processing a first event 120 unnecessarily (and thus expending computing resources unnecessarily), reducing unnecessary network traffic in publishing a second event 182 based on the first event 120, and reducing unnecessary processing of the second event 182 by code that is subscribed to receive that event.

In one example shown in FIG. 1A, first event 120A is processed responsive to determining that a value of an attribute of the first event 120A (e.g., field changed 134AA) indicates that a field of the first record 101A (i.e., consent field 108A) stores an updated value that relates to consent (i.e., "opt-out"). Responsive to determining in block 147 that the first event 120A is to be processed, flow passes to block 150.

In block 150, a first event 120 is processed. Block 150 includes optional block 153, in which additional information is retrieved to include in a second event 182. The additional information may include items of data previously described if those items of data are not included in the first event 120. Additionally or alternatively, the additional information may include other items of data; e.g., one or more of 1) an ID for the person (i.e., to whom the record that was updated, deleted, or inserted relates), where the ID can be used to identify one or more other records relating to the record that was updated, deleted, or inserted; 2) one or more IDs for those other records; 3) in a multi-tenant implementation, an ID for the tenant (also referred to as a tenant ID) to which the record that was updated, deleted, or inserted pertains; etc. Thus, the second event 182 may include data which is not included in the first event 120 but is part of or further describes the record 101 of interest. Retrieving additional information to include in the second event 182 optionally includes retrieving information from database 102 by way of submitting one or more request(s) 175A-D to database 102 and receiving one or more response(s) 179A-D from the database 102. Block 153 is later described in more detail referring to FIG. 2A.

Including additional information in the second event 182 provides advantages to consumers of the second event 182 and to the system itself. By including additional information in the second event 182, consumers need not obtain that information themselves. This reduces the need for consumers to perform additional processing, and obviates consumers knowing how to obtain the information. For example, obtaining an ID for the person, one or more IDs for records relating to the record that was updated, deleted, or inserted, and/or a tenant ID requires knowledge of the datamodel of database 102 and/or other sources of data. Including such information in the second event 182 before providing the second event 182 to a consumer means that consumers need not have such knowledge and need not query the database 102 or other sources of data for that information. Moreover, the system itself is improved. For example, the system can meter access to the database 102; e.g., restrict consumers' access to the additional information stored therein. Utilization of database 102 is more predictable because consumers need not asynchronously query the database after receiving a second event. The additional information need only be retrieved once from the database regardless of the number of consumers who need the information, rather than being retrieved as many times as the number of consumers. Also, additional information can be retrieved in a more performant manner. For example, in some implementations, the request(s) 175A-D from and response(s) 179A-D to the event handler 140 are likely to exhibit lower latency than comparable request(s) from and response(s) to consumers.

From block 153, flow passes to block 156, in which information is stored in the second event. For example, in one implementation, information that is stored in the second event 182 may be based on information included in the first event 120 and information from database 102. That information may be stored in the second event 182 according to a schema (i.e., a set or ordered set of attributes, one or more of which may have a designated data type) that facilitates consuming the information. For example, the second event 182 may include a consent status attribute (see, e.g., consent status 166A in FIG. 1A). Including a consent status attribute facilitates consuming the second event 182; for example, 1) a consumer can more easily determine whether a second event 182 relates to a change in a consent value by determining whether the second event includes a consent status attribute or not; and 2) a consumer can process, or not process, the second event 182 accordingly. Block 156 is later described in more detail referring to FIG. 2C.

From block 156, flow passes to block 159 to store the event such that the second event can be published. Specifically, at time 1d (shown by circled reference "1d"), second event 182A is published. Second event 182A is based on first event 120A. Like first event 120A, second event 182A includes record ID 130A (with value "3b") and event type 132A (with value "UPDATE"). In contrast with first event 120A, second event 182A includes topic ID 160 (with value "Norm."); party ID 163A (with value "0x00A"); consent status 166A (with value "opt-out"); associated record IDs 169A (with value "s0"); and new value(s) 172A (with value "Consent/opt-out"). In one implementation, publishing an event includes creating an event. Creating an event may include instantiating an object and setting values for one or more attributes of the object (e.g., the attributes and values described for second event 182A). In another implementation, publishing an event includes calling an API endpoint (e.g., associated with a source of events) with a created event or data comprising an event to be published, and optionally a topic ID for the event. Additionally or alternatively, an event can be published using other techniques (e.g., by inserting a record corresponding to the event in a database, by pushing the event to a cache, etc.).

Topic ID 160 included in second event 182A contrasts with topic ID 126A stored in first event 120A as the former has the value "Norm." whereas the latter has the value "Individual." In some implementations, topic ID 126A corresponds to an identifier for the DBO in which the record was inserted, deleted, or updated (i.e., an ID for the first DBO 104A). In a first event 120, including an ID for the DBO as the topic ID 126 facilitates filtering the first event 120. In particular, event handler 140 may 1) subscribe to the topics that correspond to the database objects that store records relating to consent (e.g., DBOs that store records relating to consent 104A-D), and 2) receive first events published to the first source of events 122, which are associated with those topics. In this approach, the first events which are received reflect changes to the corresponding database objects that store records relating to consent. However, this approach needs as many subscriptions as database objects that store records relating to consent.

In contrast, implementations may associate the second event 182 with a topic that is common to events published to the second source of events 185 responsive to processing first events retrieved from the first source of events 122 (e.g., by including topic ID 160 with value "Norm."). By associating a second event 182 with a common topic regardless of whether the processed events were published responsive to updates, deletions, or insertions of records in the first DBO 104A, the second DBO 104B, or one of the DBOs that store records relating to consent 104A-D, consumers can subscribe to a single topic to receive events that reflect changes relating to consent in those database objects. In this approach, the events which are received reflect changes relating to consent in the corresponding database objects.

Allowing consumers to subscribe to a single topic rather than multiple topics simplifies consumers' configuration. Use of a topic ID 160 such as "Norm." that is not based on IDs of DBOs in database 102 means that consumers need not know those IDs. Further, providing a single topic to which consumers are to subscribe to receive events published to the second source of events 185 reduces the number of subscriptions that the system must support and process. For example, if an implementation includes ten database objects that store records relating to consent and thus ten corresponding topics, allowing one thousand consumers to each subscribe to those topics results in ten thousand subscriptions. In comparison, allowing the one thousand consumers to each subscribe to a single topic results in one thousand subscriptions for the consumers (and ten subscriptions for event handler 140). Thus, use of a single topic in relation to consent-related changes to DBOs 104 can reduce load on the system in terms of registering subscriptions, storing subscription information, and distributing events.

Returning to FIG. 1A, second event 182A includes party ID 163A (with value "0x00A") and associated record IDs 169A (with value "s0"). First record 101A and second record 101B are related as indicated by the line between them in FIG. 1A; e.g., both first record 101A and second record 101B relate to the same person. Thus, second event 182A includes the value "s0" in associated record IDs 169A because that value corresponds to the ID of second record 101B. In one implementation, a party ID 163 identifies a person and/or can be used to identify one or more records relating to the person. In such an implementation, the party ID 163A with value "0x00A" identifies the person to which the first record 101A (with ID "3b") and second record 101B (with ID "s0") relate. For example, the party ID 163 may represent a key that is shared between those records, which are retrievable from database 102 using that key (e.g., first DBO 104A and second DBO 104B might both include party ID fields (not shown)). Including the party ID 163 in a second event 182 thus facilitates a consumer retrieving records that relate to a person, as well as other advantages (e.g., allowing a consumer to map a change in consent to an identifiable person). In another implementation, the associated record IDs are retrieved and stored in associated record IDs 169A (and the IDs may be enhanced with information to locate the corresponding records, such as an ID for a DBO in which each corresponding record is located).

As mentioned previously, including additional information such as the associated record IDs 169 in a second event 182 benefits consumers of the second event 182. For example, a consumer which receives second event 182 is aware that the record 101 that was updated, deleted, or inserted is related to other records that relate to consent. Thus, the consumer can determine what action is needed responsive to receiving the second event 182. The associated record IDs 169 themselves are potentially useful to the consumer as well because the consumer can use those IDs as necessary to retrieve the records with those IDs from database 102. Further, including associated record IDs 169 in second event 182 may require submitting requests (e.g., request(s) 175) and receiving responses (e.g., response(s) 179) from database 102. Requests and responses to obtain associated record IDs 169 are likely to exhibit lower latency if respectively submitted and received by event handler 140 rather than a consumer. This in turn reduces the time to process a second event 182 for a consumer. The consumer also avoids making requests to obtain the associated record IDs, which may incur financial costs (e.g., related to use of database 102 if so licensed to a consumer). Querying database 102 once to retrieve associated record IDs 169 for all consumers interested in second event 182 reduces load on database 102 relative to all those consumers querying database 102 to retrieve the associated record IDs 169, which also requires appropriate permissions and knowledge of how to retrieve them.

Second event 182A also includes consent status 166A with value "opt-out" and new value(s) 172A with value "Consent/opt-out." The value of consent status 166 corresponds to 1) value changed 136AA in first event 120A, and 2) the updated value of consent field 108A. The value of new value(s) 172A corresponds to the value of field changed 134AA ("Consent") in first event 120A concatenated with 1) the character "/" and 2) the value of value changed 136AA ("opt-out"). The character "/" serves to distinguish the identifier of the field, which was changed from the updated value for that field; other means for distinguishing field IDs and values for those fields are possible (e.g., using one or more whitespace characters, punctuation, alphanumeric codes, flags, etc.). Thus, new value(s) 172A provides more information than consent status 166A because new value(s) 172A include one or more IDs of fields that were updated in a record (or included in a record that was inserted). However, consent status 166A is useful to consumers of second event 182A because consent status 166A facilitates processing the second event 182A, as mentioned. For example, a consumer of second event 182A can readily determine that second event 182A relates to a consent value, based on the presence of consent status 166A and/or the value therein.

Second event 182A is published to second source of events 185. Second source of events 185 may be the same as, or different from, the first source of events 122. Some implementations may selectively publish a second event 182 to one or more of the first source of events 122, second source of events 185 (if different from the first source of events 122), and/or one or more other sources of events (not shown in FIG. 1A). This selective publication may be performed on a per-event basis, on a per-topic basis, and/or based on other criteria (e.g., whether the system is running in a production or a test environment, the actual or expected volume of events to be published, whether events are being replayed or not, etc.) and may be configurable. The first source of events 122 and second source of events 185 may also have different characteristics (e.g., be different ones of a database, a datastore, a cache, a stream, etc.). This may provide different advantages to the resulting application infrastructure (e.g., publishing an event to a database may provide resiliency; publishing an event to a stream may provide scalability, etc.).

When published in the second source of events 185, the second event 182A can be retrieved by one or more consumers, which have subscribed to the topic with the corresponding topic ID 160 (e.g., "Norm."). For example, organization 189 owns and/or operates code 192A-D, each of which are to retrieve one or more second events from the second source of events 185 as indicated with dashed lines. Organization 189 also owns and/or operates code 195 which is associated with database (DB) 198. An organization may have several sources of information relating to consent. For example, an organization may use a CRM system or service for managing sales activities and a marketing automation system or service for marketing activities. Such an organization needs to synchronize consent-related information in its systems when changes to consent occur in one of the systems (e.g., in database 102, which may be external to the organization). Moreover, synchronization may need to occur in a timely manner to ensure compliance with applicable privacy laws and regulations, to avoid alienating persons who have changed their consent values, to reduce reputational risk, etc. Thus, code 195 and DB 198 may be associated with a system that stores information relating to consent, and code 192A may be associated with an interface to that system. When code 192A retrieves a second event 182 from the second source of events 185, code 192A can update others of the organization's systems that store information relating to consent (e.g., the system with which code 195 is associated).

Implementations have been described which process a first event 120A responsive to an update to a first record 101A that includes a field that stores a consent value (i.e., consent field 108A). Other implementations process a first event 120 responsive to an update to a record 101 that does not include a field that stores a consent value but that nonetheless relates to consent. A record that relates to consent may include data to which a consent value corresponds. For example, second DBO 104B includes ID fields 110A-D which store IDs for respective records and email fields 112A-D which store email addresses. Database 102 may store consent values that correspond to the email addresses in email fields 112A-D. For example, rather than "Individual," first DBO 104A may have an identifier "Email Consent" and consent fields 108A-D may correspond to persons' consent to be contacted via the email addresses stored in email fields 112A-D. Thus, in such an example, an update to second DBO 104B relates to consent despite second DBO 104B not storing consent values.

To illustrate, at time 2a (indicated with circled reference "2a"), an update to a value of email field 112B of third record 101C occurs. Responsive to the update, first event 120B is published in block 118 to the first source of events 122. First event 120B is associated with topic 124B and includes topic ID 126B (with value "Con. Pt." reflecting "Contact Point"); ID for DBO 128B (with value "Con. Pt." reflecting an exemplary identifier for second DBO 104B); record ID 130B (with value "5a" corresponding to the value of ID field 110B); event type 132B (with value "UPDATE" indicating that a record was updated); field changed 134BA (with value "Email" corresponding to the identifier of the field that was updated); and value changed 136BA (with value "1@i.com" which represents an updated email address).

At time 2b (indicated with circled reference "2b"), first event 120B is retrieved from the first source of events 122 in block 142. Responsive to determining in block 147 that first event 120B is to be processed, block 150 is performed. Blocks 153 and 156 have been described referring to first event 120A and can be performed/executed in a similar fashion in relation to the first event 120B. In block 159, second event 182B is published. Like second event 182A, second event 182B includes topic ID 160 with value "Norm."

Second event also includes the value "0x00A" for party ID 163B. This is the same value for party ID 163 that is included in party ID 163A of second event 182A. Third record 101C, first record 101A, and second record 101B are related as shown by the lines between 1) third record 101C and first record 101A, and 2) third record 101C and second record 101B. Thus, second event 182B includes the values "3b" and "s0" in associated record IDs 169B because those values correspond to the IDs of first record 101A and second record 101B (and those IDs identify records that relate to the person to which third record 101C relates).

Figure 1B:
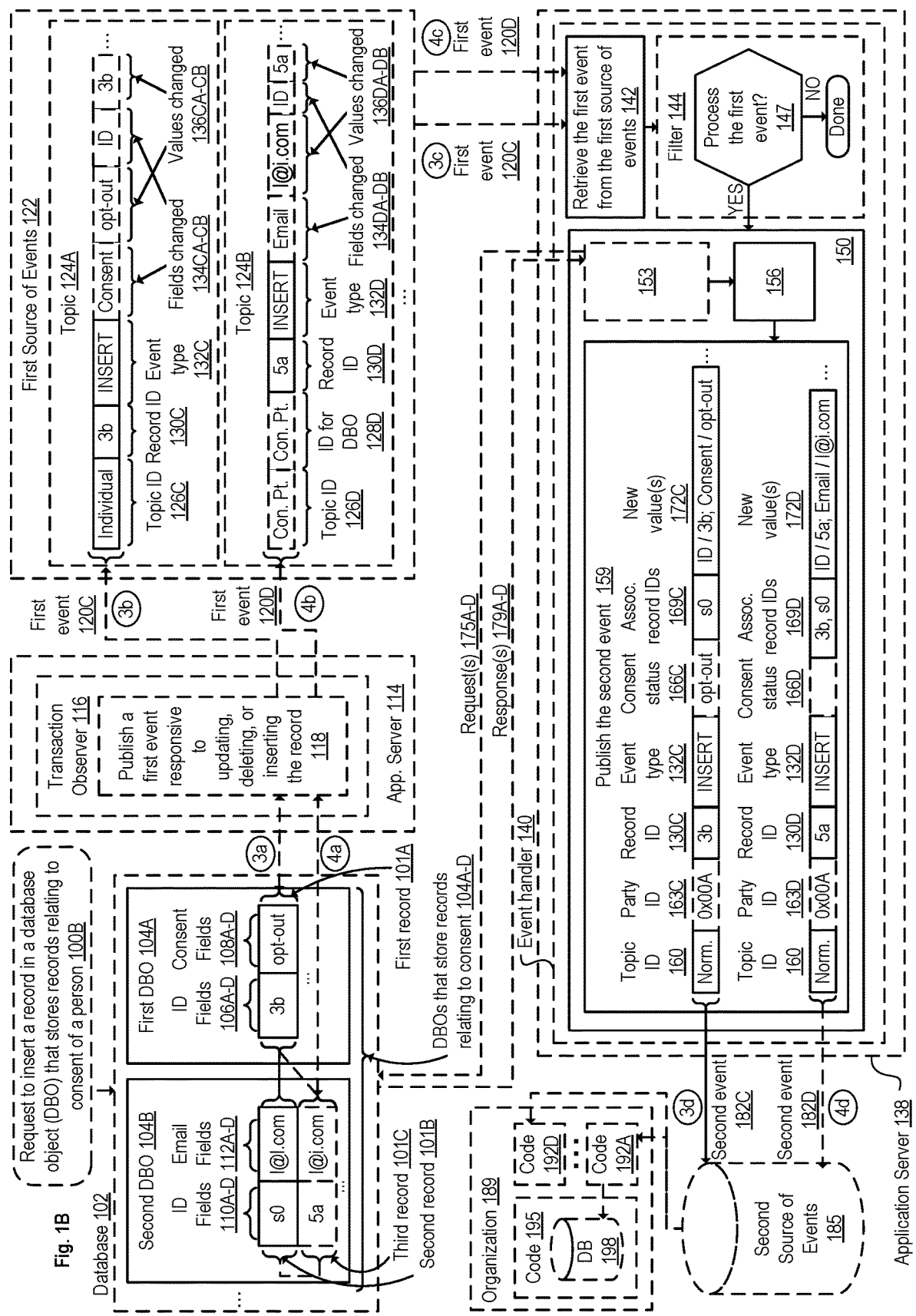
FIG. 1B is a block diagram that shows a system for selectively processing an event published responsive to inserting a record that relates to consent, according to some example implementations.

Notably, second event 182B does not include a value for consent status 166B. In one implementation (such as shown in FIG. 1B), when a record 101 is updated and that record does not include a field that stores a value relating to consent (e.g., third record 101C), the corresponding second event 182 does not include a consent status attribute such as consent status 166B. Alternatively, the second event 182 includes the attribute but no value is included for the attribute. Omitting the attribute or a value therefor facilitates a consumer which consumes the second event 182B in processing the event; e.g., the consumer can readily determine that the second event 182B does not relate to a consent value, based on the absence of consent status 166 or a value therefor.

Processing a first event (such as first event 120B) that corresponds to a change in a record that relates to consent, but that does not include a field that stores a consent value (e.g., a record that relates to one or more actions to which consent relates, that relates to how consent values or information about the person are stored, that is associated with a record that includes a field that stores a consent value, that includes data to which a consent value corresponds, etc.), allows consumers to have a complete picture of consent-related changes. For example, the change described in relation to email field 112B may reflect a change in a professional email address of a person who has opted out of communication via that email address with organization 189. Organization 189 therefore needs to know not only that the person's professional email address has changed, but also that the person's consent value of "opt-out" applies to that email address and might need to update other systems accordingly. As described herein, processing a first event 120 (such as first event 120B) and publishing a second event 182 (such as second event 182B) allows an organization to receive timely and complete information about consent-related changes, while providing the advantages described herein (e.g., ease of consuming the events, reduced load on the system, etc.).

FIG. 1B is a block diagram that shows a system for selectively processing an event published responsive to inserting a record that relates to consent, according to some example implementations. Elements in FIG. 1B with the same reference numbers as elements in FIG. 1A have been described referring to FIG. 1A.

In FIG. 1B, responsive to a request insert a record in a DBO that stores records relating to consent of a person 100B, first record 101A is inserted in first DBO 104A at time 3a, and third record 101C is inserted in second DBO 104B at time 4a. Responsive to inserting the first record 101A and third record 101C, first event 120C and first event 120D are respectively published at times 3b and 4b to first source of events 122.

First event 120C includes various items of data: topic ID 126C (with value "Individual"); a record ID 130C (with value "3b"), which corresponds to an ID for first record 101A that was inserted; and an event type 132A (with value "INSERT"), which corresponds to whether first record 101A was updated, deleted, or inserted. First event 120C also includes fields changed 134CA-CB (with respective values "Consent" and "ID") and values changed 136CA-CB (with respective values "opt-out" and "3b"). Fields changed 134CA-CB thus includes identifiers for the fields of first record 101A (i.e., consent field 108A and ID field 106A), and values changed 136CA-CB includes the values of those fields.

First event 120D includes: topic ID 126D (with value "Con. Pt."); a record ID 130D (with value "5a"), which corresponds to an ID for third record 101C; and an event type 132D (with value "INSERT"), which corresponds to whether third record 101C was updated, deleted, or inserted. First event 120D also includes fields changed 134DA-DB (with respective values "Email" and "ID") and values changed 136DA-DB (with respective values "1@i.com" and "5a"). Fields changed 134DA-DB thus include identifiers for the fields of third record 101C (i.e., email field 112B and ID field 110B), and values changed 136DA-DB include the values of those fields.

First event 120C and first event 120D are retrieved from the first source of events 122 in block 142 at time 3c and time 4c, respectively. Block 150 is performed responsive to determining in block 147 that each of first event 120C and first event 120D are to be processed (e.g., that the value of event type 132C of the first event 120C indicates that the first record 101A was inserted in the first DBO 104A; and that the value of event type 132D of the first event 120D indicates that the third record 101C was inserted in the second DBO 104B, which are two DBOs 104 that store records relating to consent). Blocks 153 and 156 have been described referring to FIG. 1A.

In block 159, second event 182C and second event 182D are published to second source of events 185 at times 3d and 4d, respectively. Like second event 182A and second event 182B, second event 182C and second event 182D each include topic ID 160 with value "Norm." and respectively include 1) party ID 163C and party ID 163D, each with value "0x00A"; 2) record ID 130C and record ID 130D, respectively with values "3b" and "5a"; and 3) event type 132C and event type 132D, each with value "INSERT." Second event 182C includes consent status 166C with value "opt-out" whereas second event 182D either does not include, or includes without a value, consent status 166D. Second event 182C also includes associated record IDs 169C with value "s0" (corresponding to the ID of first record 101A), whereas second event 182D includes associated record IDs 169D with value "3b, s0" (corresponding to the IDs of first record 101A and second record 101B). Second event 182C does not include the value "5a" in associated record IDs 169C because in the examples shown, first event 120C is published at time 3b, which is before the insertion of third record 101C (with ID "5a"). Second event 182C includes new value(s) 172C with value "ID/3b; Consent/opt-out." This value reflects that first record 101A was inserted and includes 1) a field with identifier "ID" and value "3b," and 2) a field with identifier "Consent" and value "opt-out." Second event 182D includes new value(s) 172D with value "ID/5a; Email/1@i.com" This value reflects that third record 101C was inserted and includes 1) a field with identifier "ID" and value "5a," and 2) a field with identifier "Email" and value "1@i.com."

In some implementations, the respective values stored in the third attribute of the second event 182 each relate to consent. For example, this occurs if 1) the fields of record 101A that was inserted each store values that relate to consent; and/or 2) the record 101A that was inserted includes fields that store values that do not relate to consent, but those fields are not included in the third attribute of the second event 182 (e.g., new value(s) 172). Not including fields with values that do not relate to consent in the third attribute may provide advantages; e.g., the size of the second event is reduced, and consumers need not parse and process those fields' values, which may be less relevant or irrelevant for the consumers.

Figure 1C:
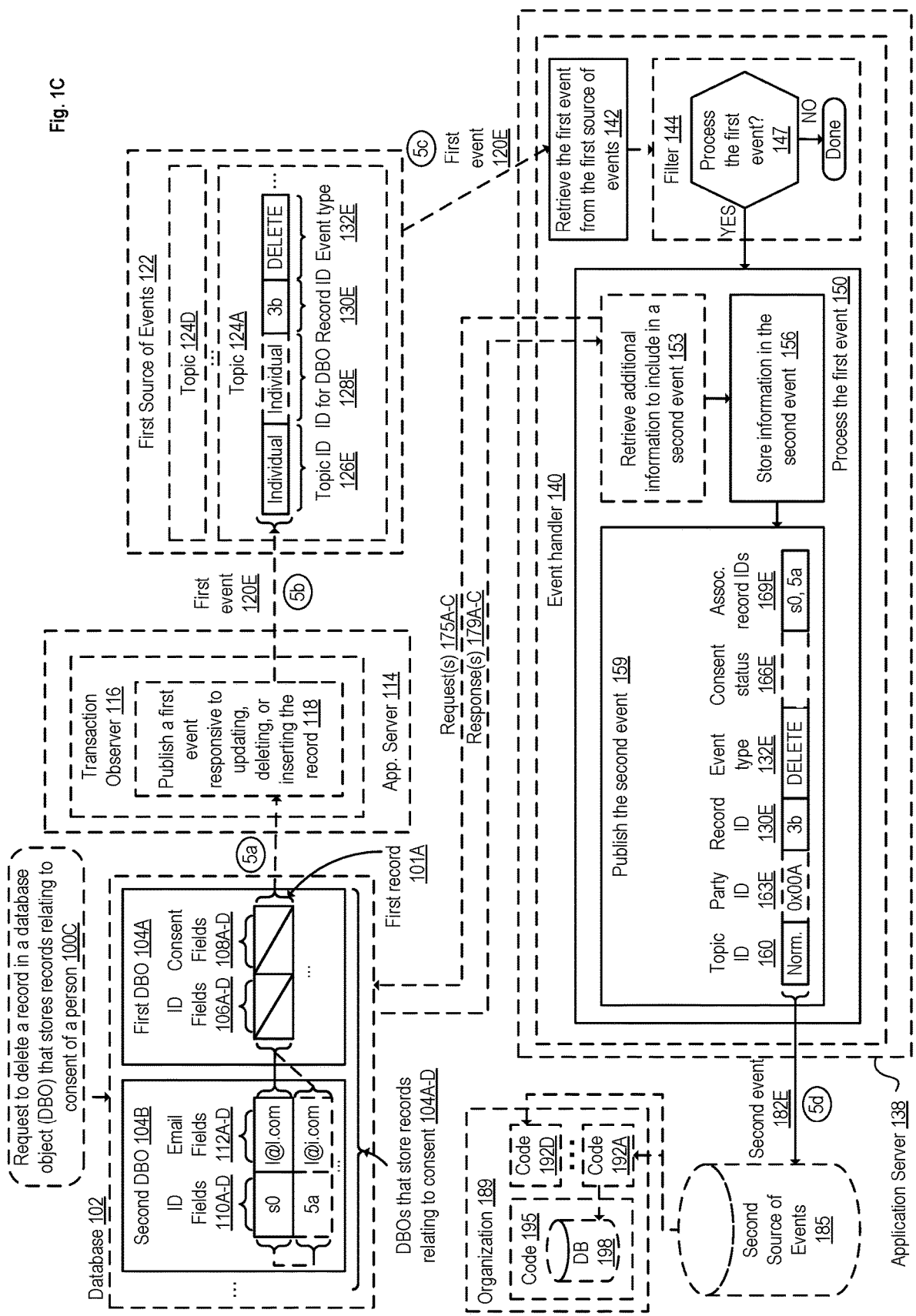
FIG. 1C is a block diagram that shows a system for selectively processing an event published responsive to deleting a record that relates to consent, according to some example implementations.

FIG. 1C is a block diagram that shows a system for selectively processing an event published responsive to deleting a record that relates to consent, according to some example implementations. Elements in FIG. 1C with the same reference numbers as elements in FIG. 1A or FIG. 1B have been described referring to such figure(s).

In FIG. 1C, responsive to a request to delete a record in a DBO that stores records relating to consent of a person 100C, first record 101A is deleted. Responsive to deleting the first record 101A, first event 120E is published at time 5b to first source of events 122.

First event 120E includes topic ID 126E (with value "Individual"); an ID for DBO 128E (same); a record ID 130E (with value "3b"); and an event type 132E (with value "DELETE") which corresponds to whether the first record 101A was updated, deleted, or inserted. In some implementations, first event 120E does not include attributes that store information relating to the fields of the first record 101A that was deleted or the values thereof. In other implementations, a first event published responsive to a deletion of first record 101A may include such attributes, and those attributes may reflect the fields of first record 101A and their values before first record 101A was deleted. For example, a deleted record may be cached, or database 102 may be implemented as a temporal database, in each case such that the values of the deleted record's fields can be retrieved and included in a first event 120.

First event 120E is retrieved from the first source of events 122 in block 142 at time 5c. Block 150 is performed responsive to determining in block 147 that first event 120E is to be processed (e.g., that the value of event type 132E of the first event 120E indicates that the first record 101A was deleted in first DBO 104A, which is one of the DBOs 104 that store records relating to consent). Blocks 153 and 156 have been described referring to FIG. 1A. In block 159, second event 182E is published to second source of events 185 at time 5d. Second event 182E, like second event 182A, second event 182B, second event 182C, and second event 182D, includes topic ID 160 with value "Norm." Second event 182E also includes 1) party ID 163E with value "0x00A"; 2) record ID 130E with value "3b"; and 3) event type 132E with value "DELETE". Second event 182E either does not include, or includes without a value, consent status 166E. Second event 182C also includes associated record IDs 169E with value "s0, 5a" (corresponding to the IDs of second record 101B and third record 101C). In one implementation (shown), second event 182E does not include a new value(s) attribute. In another implementation (not shown), second event 182E includes such an attribute with a value that includes identifiers and values of the record's fields before the record was deleted.

Although implementations are described in relation to updating, inserting, or deleting a record 101, in some implementations, additional or different modifications to a database can be captured. For example, some implementations may support undeleting a record 101 responsive to receiving a request to undelete the record. A record can be undeleted in different ways. In one implementation, the records in DBOs that store records relating to consent 104 are stored in a cache (e.g., at predefined intervals, responsive to updating, deleting, or inserting a record in the DBOs, etc.). Responsive to receiving a request to undelete a record 101 in one of the DBOs that store records relating to consent 104, the cache is searched to determine whether the cache stores the record 101. Responsive to determining that the cache stores the record 101, the record is inserted in the database 102 in the one of the DBOs that stored record before it was deleted. Responsive to inserting the record 101, a first event 120 is published as previously described for a record 101 that is inserted, except that the event type 132 includes a value reflecting the change (e.g., a value "UNDELETE"). In another implementation, rather than using a cache, database 102 is a temporal database. A temporal database stores one or more timestamps for a record that indicate a time period in which the record is valid. Deleting a record in such a database may include updating a timestamp for the record to indicate that the record is no longer valid. Undeleting the record may include updating the timestamp to indicate the record is valid.

FIG. 2A is a flow diagram that shows a method for selectively processing an event published responsive to updating, inserting, or deleting a record that relates to consent, according to some example implementations. In block 200, from a first source of events 122, a first event 120 is retrieved that was published to the first source of events 122 responsive to updating, deleting, or inserting a record 101 in a database object. From block 200, flow passes to block 144 or block 147, which includes determining whether the first event 120 is to be processed.

Referring to FIG. 2B, block 147 optionally includes block 235. Block 235 includes determining whether the record 101 that was updated, deleted, or inserted relates to consent. This determination can be made in different ways. As previously described, in some implementations, a first event 120 is associated with a topic that relates to the DBO in which the record 101 was updated, deleted, or inserted (e.g., an ID for the topic may include an identifier for the DBO). Optional block 240 includes determining whether the topic with which the first event 120 is associated indicates that the first event 120 relates to a record in a database object that stores records relating to consent 104. For example, an implementation may include a set of identifiers for DBOs that store records relating to consent 104. Such an implementation can then determine whether the DBO in which the record 101 was updated, deleted, or inserted relates to consent by comparing the topic of the first event 120 with the set of identifiers for DBOs that store records relating to consent 104. Other implementations use other ways for determining whether the record 101 relates to consent. For example, one or more identifiers included in a first event 120 for fields that were changed in the record 101 may indicate that the record 101 relates to consent (e.g., the identifiers may be compared to known identifiers for fields that relate to consent).

Responsive to determining that the record 101 does not relate to consent, processing the first event 120 does not occur. For example, the topic with which first event 120 is associated might indicate that the first event 120 does not relate to a record 101 in a database object that stores records relating to consent 104.

Responsive to determining that the record 101 that was updated, deleted, or inserted relates to consent, flow passes to optional block 245. Block 245 includes determining whether an attribute of the first event 120 indicates that the record 101 was updated, deleted, or inserted. For example, a value of "UPDATE" in event type 132 of a first event 120 (e.g., first event 120A in FIG. 1A) indicates that first record 101A was updated; a value of "INSERT" (e.g., first event 120C in FIG. 1B) indicates that first record 101A was inserted; and a value of "DELETE" (e.g., first event 120E in FIG. 1C) indicates that first record 101A was deleted. Determining that the record 101 was inserted or deleted corresponds to determining that the first event is to be processed, and flow passes to block 150. Responsive to determining that the record was updated, flow passes from block 245 to block 250.

Block 250 includes determining whether the fields of the record 101 which were updated include one or more fields that store values that relate to consent. As discussed previously, a record that relates to consent might include one or more fields that do not store values that relate to consent, or that only relate to consent under certain conditions. Implementations that include block 250 effectively filter first events 120 that correspond to an update to only one or more such fields of a consent-related record, such that those first events 120 are not processed. In one implementation, determining whether the updated fields include one or more fields that store values that relate to consent may be performed by comparing the fields to a set of known fields that relate to consent. Other implementations make the determination differently. For example, another implementation determines whether updated values correspond to consent values such as "opt-out," "opt-in," etc.

Responsive to determining that the updated record 101 does not include one or more fields that were updated that store values that relate to consent, processing the first event 120 does not occur. For example, first event 120 might correspond to an update to a field that stores a value relating to the person's ethnicity, as previously mentioned. If only that field is updated, the fields of the record that were updated do not include a field that stores a value relating to consent, and first event 120 is not processed.

Responsive to determining that the updated record 101 includes one or more fields that were updated that store values that relate to consent, flow passes from block 250 to block 150.

Referring back to FIG. 2A, block 150 optionally includes block 153, wherein additional information to include in a second event 182 is retrieved. Block 153 optionally includes block 210, which includes determining whether the first event 120 includes an identifier for the person (i.e., to whom the record that was updated, deleted, or inserted relates), such as a party ID. Responsive to determining that the first event 120 does not include an identifier for the person, flow passes to block 215.

In block 215, an identifier for the person is retrieved from the database 102. For example, in implementations which include a field for a party ID (previously described) in the DBO in which the record 101 was updated, deleted, or inserted, the DBO can be queried to retrieve the party ID and thus the identifier for the person. Other implementations may not include block 215. For example, implementations may allow for retrieving an identifier for a person (such as a party ID) in ways other than retrieving the identifier from the database 102. In one implementation, an identifier for a person can be retrieved via an API (which may or may not retrieve the identifier for the person from the database 102). For example, an API may provide access to an object representing the record 101 that was updated, deleted, or inserted, and/or one or more associated records, and thus an identifier for the person. From block 215, or from block 210 responsive to determining that the first event 120 includes an identifier for the person, flow passes to block 220.

In block 220, the identifier for the person is used to retrieve, from the database 102, one or more identifiers for one or more other records that relate to the record 101 that was updated, deleted, or inserted. For example, in block 225, the identifiers for the other records are retrieved based on a key that identifies records that relate to the person and that is shared between the other records and the record 101 that was updated, deleted, or inserted. From block 220, flow passes to block 230.

In block 230, information relating to the first event 120 is retrieved from the database 102. For example, retrieved information may include one or more of the following items of data if not included in the first event 120: 1) a timestamp corresponding to when the record 101 was updated, deleted, or inserted; 2) a timestamp corresponding to when the transaction that included the update, deletion, or insertion was started; 3) a commit ID for the transaction; etc. From block 230, flow passes to block 156.

Figure 2C:
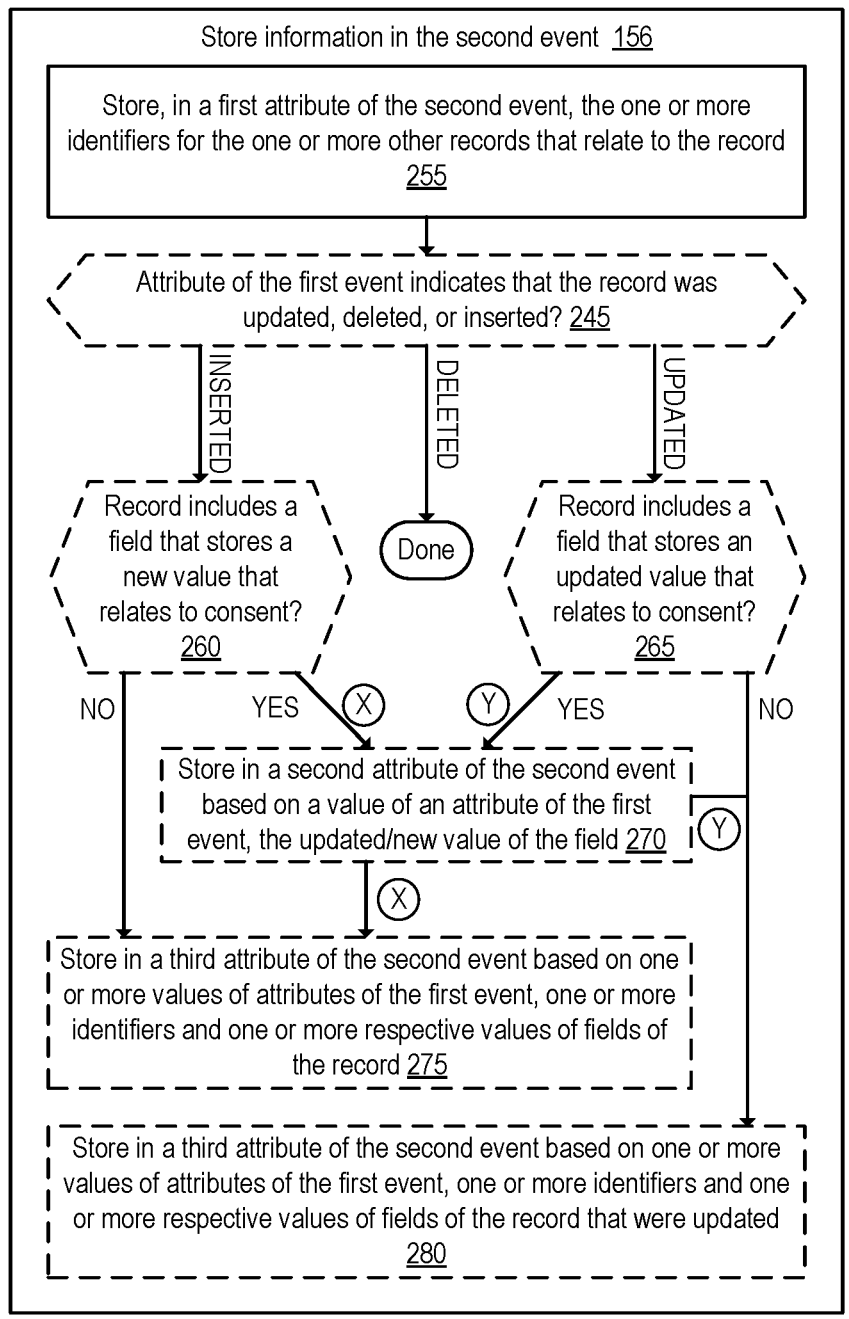
FIG. 2C is a flow diagram that shows a method for storing information in a second event to be published as part of processing a first event, according to some example implementations.

Referring to FIG. 2C, block 156 includes block 255. In block 255, the one or more identifiers for the one or more other records that relate to the record 101 are stored in a first attribute of the second event 182 (e.g., in associated record IDs 169). From block 255, flow passes to optional block 245 which was discussed referring to FIG. 2B. From block 245, flow passes 1) to block 260 responsive to an attribute of the first event 120 indicating that the record 101 was updated (e.g., event type 132A); 2) to block 265 responsive to an attribute of the first event 120 indicating that the record 101 was inserted (e.g., event type 132C); or 3) to block 159 responsive to an attribute of the first event 120 indicating that the record 101 was deleted (e.g., event type 132E).

Block 260 includes determining whether the record 101 includes a field that stores a new value that relates to consent. For example, an inserted record might relate to consent but not include fields that store values that relate to consent, or an inserted record might relate to consent and include such a field which stores a NULL or default value. Determining whether the record 101 includes a field that stores a new value that relates to consent can be performed in similar ways to the determination made in block 250; e.g., by comparing the fields of the inserted record 101 to a set of known fields that relate to consent, and optionally by further inspecting the values of any matched fields to determine if they are non-default values.

Block 265 includes determining whether the record 101 includes a field that stores an updated value that relates to consent. For example, a record 101 might have one or more fields updated, but those fields do not store values that relate to consent. Determining whether the record 101 includes a field that stores an updated value that relates to consent can be performed in similar ways to the determination made in block 260.

Responsive to determining that the record 101 1) includes a field that stores a new value that relates to consent in block 260, or 2) includes a field that stores an updated value that relates to consent in block 265, flow passes from block 260 or block 265 to block 270.

In block 270, 1) the updated value of the field that stores a value that relates to consent (in the case of an updated record 101), or 2) the new value of such field (in the case of an inserted record 101), is stored in a second attribute of the second event 182 based on a value of an attribute of the first event 120. For example, 1) referring to FIG. 1A, the value "opt-out" of value changed 136AA in first event 120A is stored in consent status 166A of second event 182A; and 2) referring to FIG. 1B, the value "opt-out" of value changed 136CA in first event 120C is stored in consent status 166C of second event 182C. from block 270, flow passes to block 275 in the case that the record was inserted (indicated with circled reference "X") or to block 280 in the case that the record was updated (indicated with circled reference "Y").

In block 275, one or more identifiers and one or more respective values of fields of the record 101 are stored in a third attribute of the second event 182 based on one or more values of attributes of the first event 120 (e.g., new value(s) 172). For example, referring to FIG. 1B, the value "ID/3b; Consent/opt-out" is stored in new value(s) 172C of second event 182C based on 1) the value "ID" of field changed 134CB and the value "3b" of value changed 136CB, and 2) the value "Consent" of field changed 134CA and the value "opt-out" of value changed 136CA, of first event 120C.

In block 280, one or more identifiers and one or more respective values of fields of the record 101 that were updated are stored in a third attribute of the second event 182 based on one or more values of attributes of the first event 120 (e.g., new value(s) 172). For example, referring to FIG. 1A, the value "Consent/opt-out" is stored in new value(s) 172A of second event 182A based on the value "Consent" of field changed 134AA and the value "opt-out" of value changed 136AA of first event 120A. In some implementations, the respective values stored in the third attribute of the second event 182 each relate to consent. For example, this occurs if 1) the fields with updated values store values that relate to consent (put differently, only consent-related fields of the record were updated); and/or 2) the fields with updated values include fields that store values that do not relate to consent, but the latter fields are not included in the third attribute of the second event 182 (e.g., new value(s) 172). Not including fields with updated values that do not relate to consent in the third attribute may provide advantages; e.g., the size of the second event is reduced, and consumers need not parse and process those fields' values, which may be less relevant or irrelevant for the consumers.

Returning to FIG. 2A, flow passes from block 156 to block 159. In block 159, the second event 182 is published (e.g., to the second source of events 185). As previously described, publishing an event means making the event available in a source of events; e.g., by calling an API endpoint (e.g., on an event bus, a message bus, etc.), by inserting a record corresponding to the event in a database, by pushing the event to a cache, etc. In some implementations, publishing an event includes specifying a topic with which the event is to be associated. Specifying a topic may be performed in different ways; e.g., by including a topic ID in or with the event, by indicating the topic to the API endpoint, etc. In optional block 290, the second event 182 is associated with a second topic (e.g., topic ID 160) that is common to events published to the second source of events 185 responsive to processing events retrieved from the first source of events 122, regardless of whether the processed events were published responsive to updates, deletions, or insertions of records in the first DBO 104A or the second DBO 104B.

FIG. 3A is a diagram that shows a mapping between a record that relates to consent and an event published responsive to updating, inserting, or deleting such a record, according to some example implementations. FIG. 3A shows a first DBO 304A, a second DBO 304B, and a first event 120.

First DBO 304A stores records relating to consent of a person, and includes the following fields: ID 106A-D (shown in FIGS. 1A-1C); process 307A-D; profile 309A-D; solicit 311A-D; track 313A-D; forget 315A-D; and name 319A-D. ID 106A-D was shown in and described in relation to FIGS. 1A-1C. The following fields each store a value representing a person's consent: 1) to process the person's data (process 307A-D); 2) to profile the person (profile 309A-D); 3) to solicit the person (solicit 311A-D); and 4) to track the person (track 313A-D). Forget 315A-D each store a value representing a person's assertion to be forgotten. Name 319A-D each store a person's name.

First DBO 304A includes an ID 303A with the value "Individual." In some implementations, this ID is the name of the database object (e.g., a name of a relational table in an RDBMS). The ID 303A is stored in topic ID 126 of first event 120 in one implementation, and optionally in ID for DBO 128 of first event 120. The value of ID 106A (i.e., "3b") is stored in record ID 130 of first event 120. Event type 132 of first event 120 is not populated with data from first record 301A. Rather, in some implementations, the value of event type 132 is set in block 118 (e.g., to "INSERT," "UPDATE," or "DELETE," corresponding to whether first record 301A is inserted, updated, or deleted) or otherwise by the component that publishes event 120.

In the case that first event 120 is published responsive to the insertion of first record 301A in first DBO 304A, all of field IDs 305AA-AJ and corresponding field values 310AA-AJ are stored in field(s) changed 134AA-AJ and value(s) changed 136AA-AJ in one implementation. In another implementation, none, some, or all of field IDs 305AA-AJ and corresponding field values 310AA-AJ are stored. For example, one implementation may store in first event 120 only those of the fields and their values of first record 301A that store values that relate to consent.

In the case that first event 120 is published responsive to the update of first record 301A in first DBO 304A, in one implementation, field IDs 305AA-AJ and corresponding field values 310AA-AJ are stored in field(s) changed 134AA-AJ and value(s) changed 136AA-AJ to the extent that the fields' values are updated. In another implementation, the fields and their values are stored to the extent that the fields' values are updated and the values relate to consent.

IDs for fields and the fields' values are stored differently in first event 120 in different implementations. In the implementation shown in FIG. 3A, a field and its value are stored as pairs with one pair in one attribute of first event 120. For example, field ID 305AA (with value "ID") and value 310AA (i.e., ID 106A, with value "3b") are stored as the value "ID:3b" in first event 120. Other schemas for first event 120 are possible; e.g., as shown in FIG. 1A, first event 120A includes separate attributes for each field ID and the field's value.

Second DBO 304B stores records relating to consent of a person but does not have fields that store values that relate to consent of the person. Second DBO 304B includes the following fields: ID 110A-D (shown in FIGS. 1A-1C); email 112A-D (shown in FIGS. 1A-1C); from 321A-D; to 323A-D; and purpose 325A-D. The fields from 321A-D each store a value that represents a date from which the corresponding email address stored in email 112A-D is valid; the fields to 323A-D each store a value that represents a date to which the corresponding email address is valid. Purpose 325A-D each store a value that describes a purpose for the corresponding email address in email 112A-D (e.g., "work," "personal," etc.).

In the case that first event 120 is published responsive to the insertion of second record 301B in second DBO 304B, all of field IDs 305BA-BF and corresponding field values 310BA-BF are stored in field(s) changed 134BA-BG and value(s) changed 136BA-BG in one implementation. In another implementation, none, some, or all of field IDs 305BA-BF and corresponding field values 310BA-BF are stored.

In the case that first event 120 is published responsive to the update of second record 301B in second DBO 304B, in one implementation, field IDs 305BA-BF and corresponding field values 310BA-BF are stored in field(s) changed 134BA-BG and value(s) changed 136BA-BG to the extent that the fields' values are updated. In another implementation, the fields and their values are stored to the extent that the fields' values are updated and the values relate to consent.

Figure 3B:
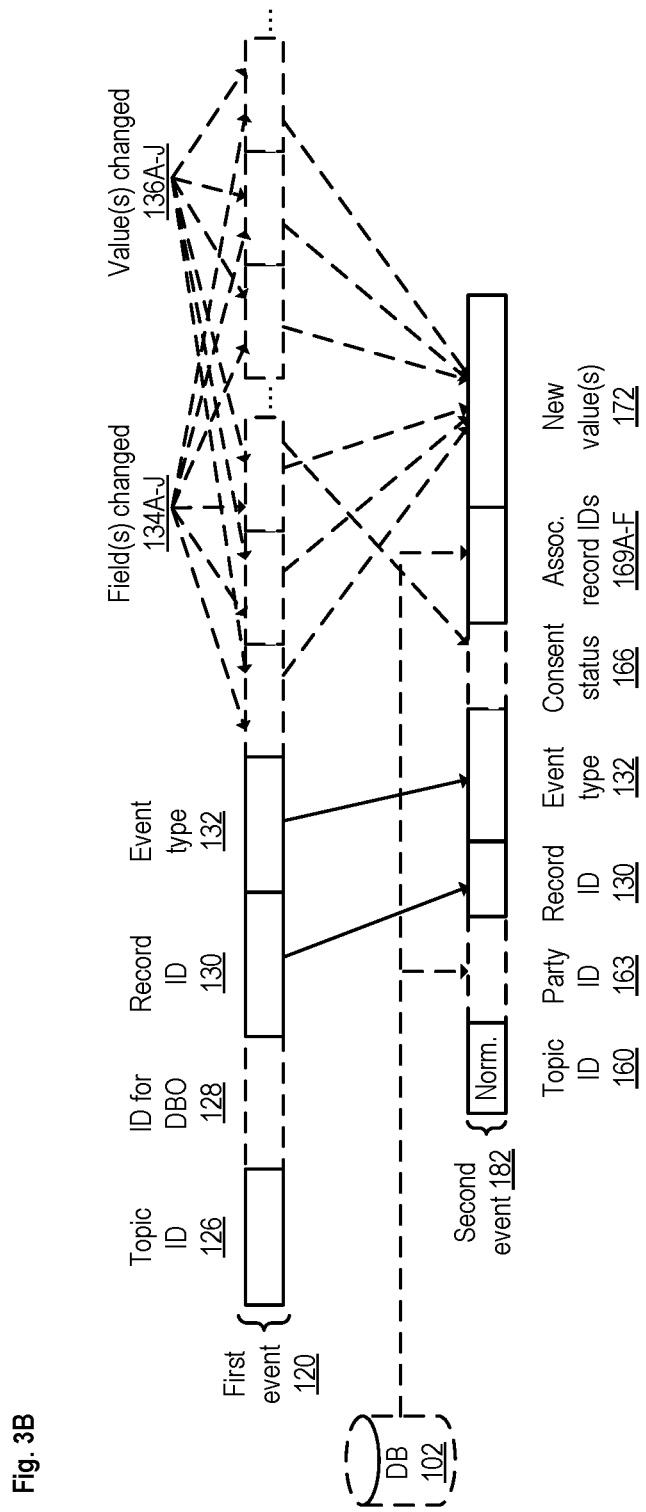
FIG. 3B is a diagram that shows a mapping between a first event published responsive to updating, inserting, or deleting a record that relates to consent and a second event published as part of processing the first event, according to some example implementations.

FIG. 3B is a diagram that shows a mapping between a first event published responsive to updating, inserting, or deleting a record that relates to consent and a second event published as part of processing the first event, according to some example implementations.

The value of topic ID 126 in first event 120 is not stored in second event 182 in one implementation. Rather, the value of topic ID 160 of second event 182 is a value common to events published to the second source of events. Record ID 130 of first event 120 is included in second event 182, as is event type 132. The values of Party ID 163 and associated record IDs 169A-F are retrieved from database 102. And the values of new value(s) 172 of second event 182 are based on the values of 1) field(s) changed 134A-J, and 2) value(s) changed 136A-J, of first event 120. Specifically, in one implementation, the values of field(s) changed 134A-J, and value(s) changed 136A-J are flattened. For example, referring to FIG. 3A, field(s) changed 134AA-AJ include the values "ID," "Process," "Profile," and "Solicit"; the value(s) changed 136AA-AJ include the values "3b," "opt-out," "opt-out," and "opt-out." In one implementation, a field changed value is concatenated with the corresponding value changed value to form a pair (e.g., "ID" is concatenated with "3b" to form "ID:3b"), and the pair concatenated with other such pairs (e.g., "ID:3b" is concatenated with "Process:opt-out" to form "ID:3b; Process:opt-out," etc.).

Figure 4:
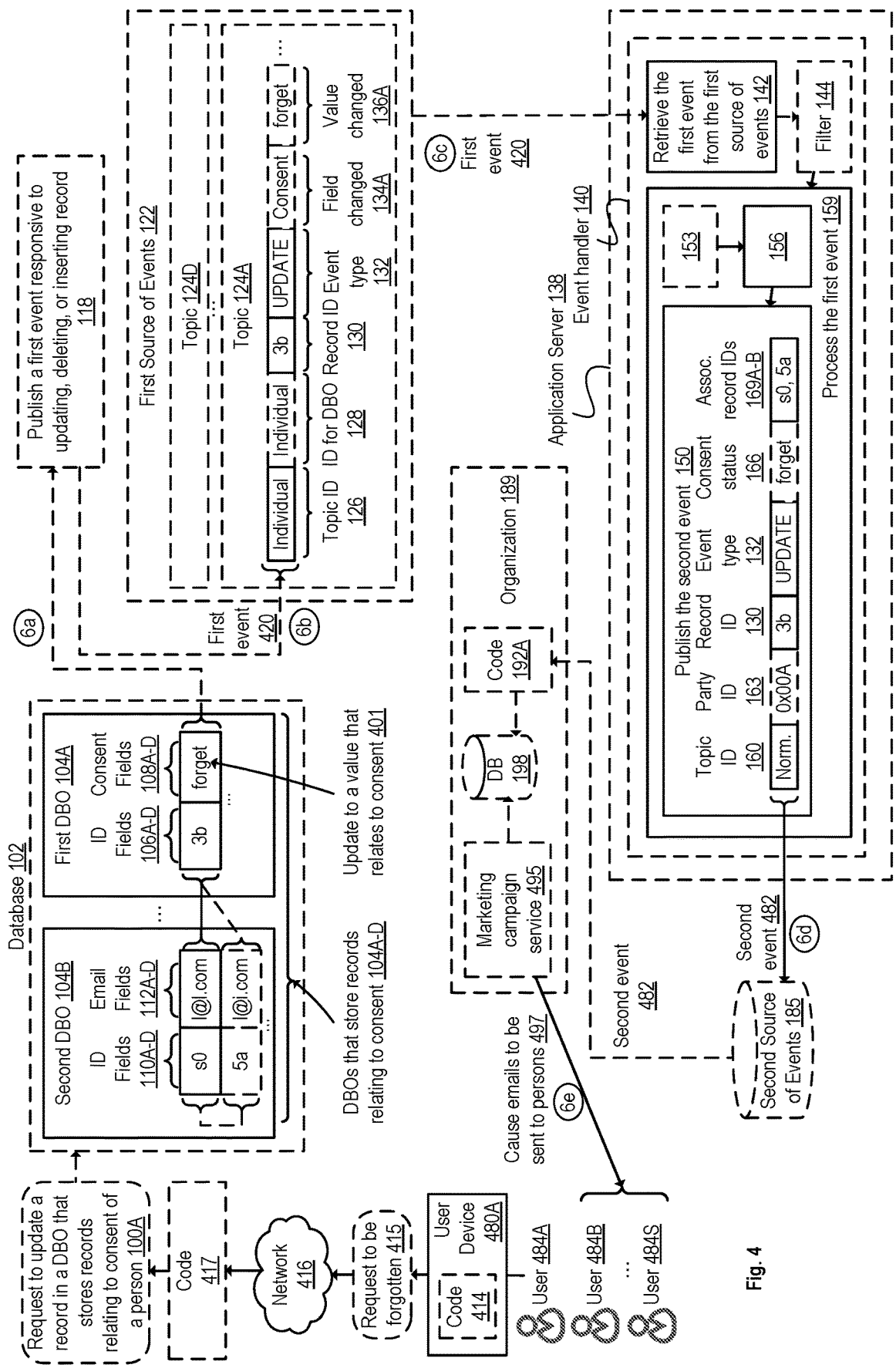
FIG. 4 is a block diagram that shows an exemplary application of selectively processing an event published responsive to updating a record that relates to consent.

FIG. 4 is a block diagram that shows an exemplary application of selectively processing an event published responsive to updating a record that relates to consent.

User 484A (e.g., a natural person) uses a device 480A with code 414 (e.g., a web-browser) to submit a request to be forgotten 415 (e.g., via a webpage) over network 416 (e.g., via the Internet) to code 417 (e.g., a web application). Responsive to receiving the request to be forgotten 415, code 417 submits a request to update a record in a DBO that stores records relating to consent of a person 100A. Specifically, the request includes an update to a value that relates to consent 401. Responsive to the request, the consent field 108A is updated with the value "forget." At time 6a, the update is indicated to block 118, which publishes a first event 420 at time 6b to first source of events 122.

First event 420 includes field changed 134A with value "Consent" and value changed 136A with value "forget." At time 6c, first event 420 is retrieved from first source of events 122 in block 142. Responsive to determining in block 144 that first event 420 is to be processed, first event 420 is processed in block 159. Blocks 144, 153, 156, and 159 have been described previously. In block 159, second event 482 is published to second source of events 185 at time 6d. Notably, second event 482 includes topic ID 160 (with value "Norm.") to which code 192A has subscribed, event type 132 (with value "UPDATE") which represents that a record with record ID "3b" (in record ID 130C) is updated, consent status 166 with value "forget," and associated record IDs 169A-F (with value "s0, 5a").

Organization 189 retrieves the second event 482 via code 192A. Second event 482 includes the associated record IDs "s0" and "5a" which facilitates code 192A querying the corresponding records in second DBO 104B. Thus, code 192A can determine that the email addresses stored in email fields 112A and 112B (corresponding to the records with record IDs "s0" and "5a" respectively) should be excluded from marketing campaigns on the basis of the consent status 466 having the value "forget," and update database 198 accordingly.

Database 198 is also used by marketing campaign service 495. At time 6e, marketing campaign service 495 causes emails to be sent to persons 497. As shown in FIG. 4, emails are caused to be sent to users 484B-S but not to user 484A. Users 484A-S may represent marketing leads for organization 189, and the emails sent to users 484B-S may represent solicitation. User 484A was not emailed after submitting the request to be forgotten 415, which caused the change in database 102. However, organization 189 has at least two sources of consent-related information: database 102, and database 198 which is used by the marketing campaign service 485. Thus, by way of the systems shown and described, organization 189 is able to reconcile its two sources of consent-related information and comply with the request of user 484A to be forgotten. Organization 189 could therefore avoid generating resentment with user 484A and potentially ensure compliance with applicable privacy laws and regulations. Moreover, organization 189 required only minimal knowledge of first DBO 104A and second DBO 104B to reconcile its consent-related systems and could subscribe to only one topic (with identifier "Norm.") to receive second event 482. This in turn means that less information and access to database 102 could be given to organization 189, and fewer subscriptions to the first source of events 122 and second source of events 185 needed to be supported.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, ROM, Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices (also referred to as devices) are designed for and/or used for a variety of purposes, and different terms may reflect those purposes (e.g., user devices, network devices). Some user devices are designed to mainly be operated as servers (sometime referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, etc.). The software executed to operate a user device (typically a server device) as a server may be referred to as server software or server code), while the software executed to operate a user device (typically a client device) as a client may be referred to as client software or client code. A server provides one or more services to (also referred to as serves) one or more clients.

The term "user" refers to an entity (e.g., a natural person or a legal person) that uses an electronic device, and software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
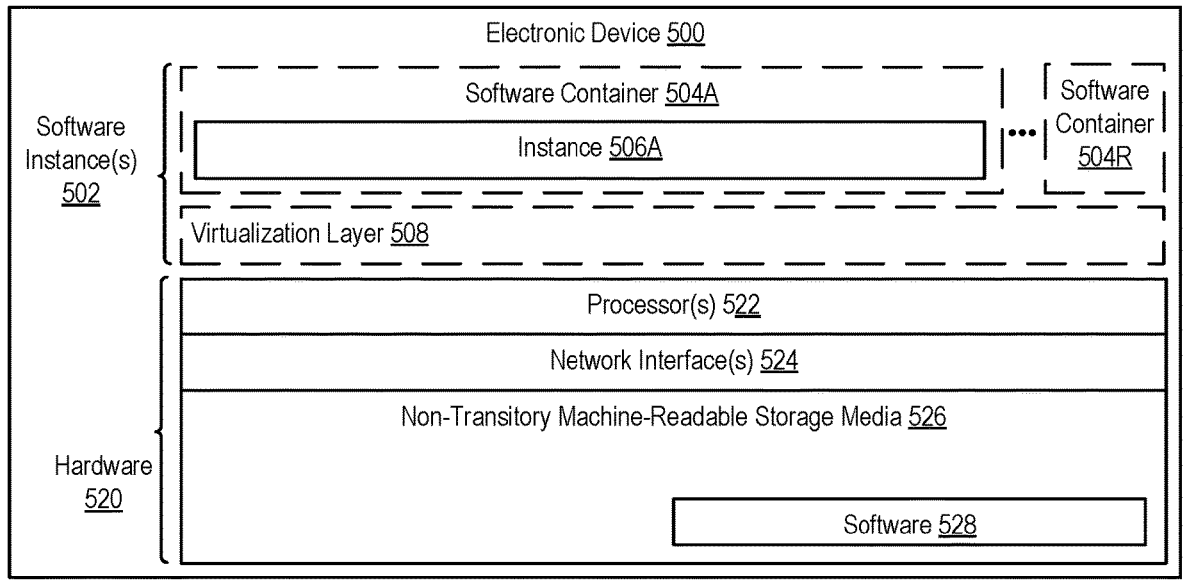
FIG. 5A is a block diagram that shows an electronic device, according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522). Each of the previously described clients and the event processing service may be implemented in one or more electronic devices 500. In one implementation, event handler 140 can be part of an event processing service. In some implementations, the event processing service may include the second source of events 185. Additionally or alternatively, the event processing service may include one or more of first source of events 122, application server 114, and database 102. In other implementations, 1) the event processing service may include any combination of one or more of event handler 140, application server 138, second source of events 185, first source of events 122, and database 102; and 2) those of the foregoing not included in the combination are implemented as separate services to the event processing service. In one implementation the event processing service can be available to one or more clients (such as consumers of events). In one implementation: 1) each of the clients is implemented in a separate one of the electronic devices 500 (e.g., in end user devices where the software 528 represents the software to implement clients to interface directly and/or indirectly with the event processing service (e.g., software 528 represents a web browser, a native client, a portal, a command-line interface, and/or an API based upon protocols such as Simple Object Access Protocol (SOAP), Representational State Transfer (REST), etc.)); 2) the event processing service is implemented in a separate set of one or more of the electronic devices 500 (e.g., a set of one or more server devices where the software 528 represents the software to implement the event processing service); and 3) in operation, the electronic devices implementing the clients and the event processing service would be communicatively coupled (e.g., by a network) and would establish between them (or through one or more other layers and/or or other services) connections for submitting events or requests to the event processing service (depending on the implementation), and allowing clients to retrieve events from the event processing service. Other configurations of electronic devices may be used in other implementations (e.g., an implementation in which the client and the event processing service are implemented on a single electronic device 500).

During operation an instance of the software 528 (illustrated as instance 506A and also referred to as a software instance; and in the more specific case of an application, as an application instance) is executed. In electronic devices that use compute virtualization, the set of one or more processor(s) 522 typically execute software to instantiate a virtualization layer 508 and software container(s) 504A-R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation an instance of the software 528 is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

Figure 5B:
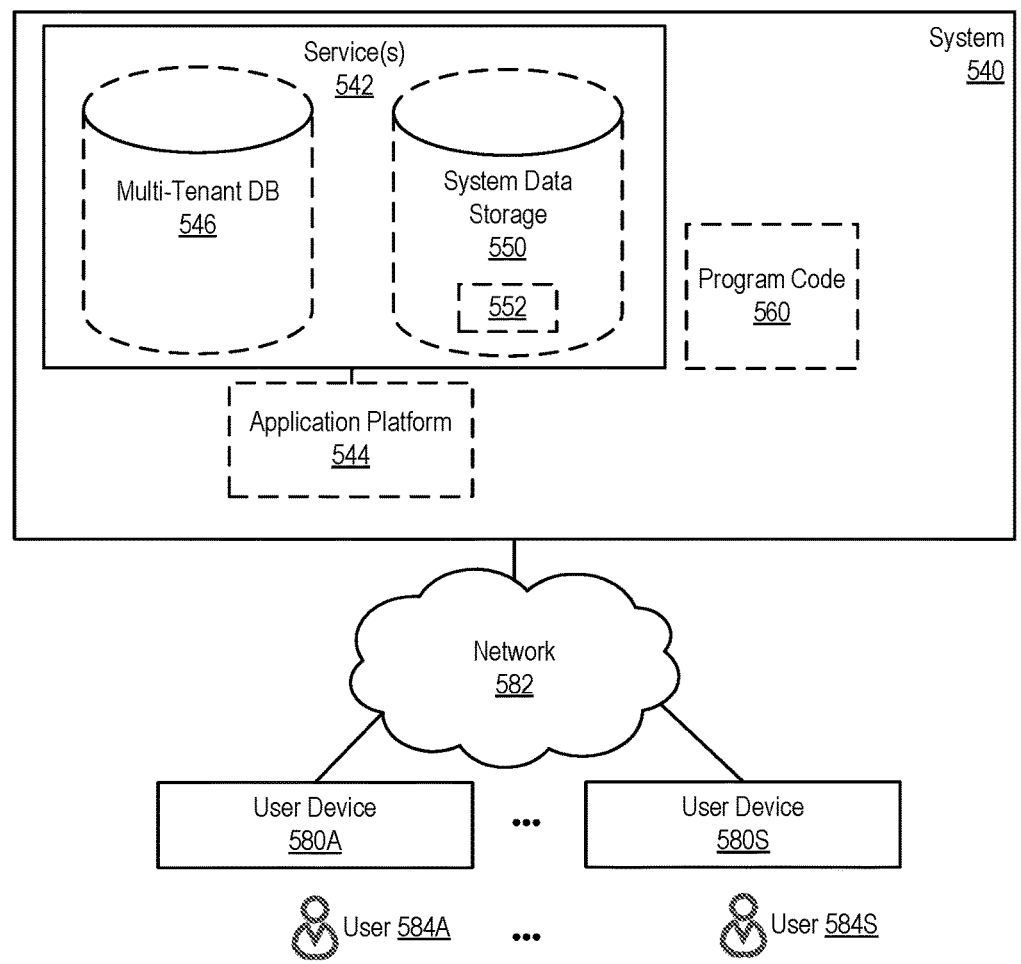
FIG. 5B is a block diagram of a deployment environment according to some example implementations.

FIG. 5B is a block diagram of a deployment environment according to some example implementations. A system 540 includes hardware (e.g., a set of one or more server devices) and software to provide service(s) 542, including the event processing service. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third party datacenter(s), which are datacenter(s) owned and/or operated by one or more different entities than the entity that provides the service(s) 542 (e.g., the different entities may host some or all of the software provided and/or operated by the entity that provides the service(s) 542). For example, third party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-S over a network 582. The service(s) 542 may be on-demand services that are made available to one or more of the users 584A-S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-S). The service(s) 542 may communicate with each other and/or with one or more of the user devices 580A-S via one or more APIs (e.g., a REST API). The user devices 580A-S are operated by users 584A-S.

In some implementations the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a CRM system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 540 is a multi-tenant cloud computing architecture supporting multiple services, such as one or more of the following:

| Type of Service | Example Service(s) by salesforce.com, inc. |
| --- | --- |
| CRM | Sales Cloud |
| Configure, price, quote (CPQ) | CPQ and Billing |
| Business process modeling (BPM) | Process Builder |
| Customer support | Service Cloud, Field Service Lightning |
| Marketing | Commerce Cloud Digital, Commerce Cloud Order Management, Commerce Cloud Store |
| External data connectivity | Salesforce Connect |
| Productivity | Quip |
| Database-as-a-Service | Database.com ™ |

-continued

| Type of Service | Example Service(s) by salesforce.com, inc. |
| --- | --- |
| Data-as-a-Service (DAAS or DaaS) | Data.com |
| Platform-as-a-service (PAAS or PaaS) | Heroku ™ Enterprise, Thunder, Force.com ®, Lightning, event processing service |
| Infrastructure-as-a-Service (IAAS or IaaS) (e.g., virtual machines, servers, and/or storage) | |
| Analytics | Einstein Analytics, Sales Analytics, Service Analytics |
| Community | Community Cloud, Chatter |
| Internet-of-Things (IoT) | Salesforce IoT, IoT Cloud |
| Industry-specific | Financial Services Cloud, Health Cloud |
| Artificial intelligence (AI) | Einstein |
| Application marketplace ("app store") | AppExchange, AppExchange Store Builder |
| Data modeling | Schema Builder |
| Security | Salesforce Shield |
| Identity and access management (IAM) | Field Audit Trail, Platform Encryption, IT Governance, Access Management, Salesforce Identity, Salesforce Authenticator |

For example, system 540 may include an application platform 544 that enables PAAS for creating, managing, and executing one or more applications developed by the provider of the application platform 544, users accessing the system 540 via one or more of user electronic devices 580A-S, or third-party application developers accessing the system 540 via one or more of user electronic devices 580A-S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user electronic device 580A-S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the one or more multi-tenant database 546 and/or system data storage 550.

In some implementations, the service(s) 542 are implemented using virtual applications dynamically created at run time responsive to queries from the user electronic devices 580A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the event processing service, may be coded using Procedural Language/Structured Object Query Language (PL/SOQL) that provides a programming language style interface, Salesforce Apex, and/or a business process modeling tool (e.g., Salesforce Process Builder). Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user electronic devices 580A-S.

Each user electronic device 580A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow a user 584 to interact with various GUI pages that may be presented to a user 584. User electronic devices 580A-S might communicate with system 540 using TCP/IP (Transfer Control Protocol and Internet Protocol) and, at a higher network level, use other networking protocols to communicate, such as Hypertext Transfer Protocol (HTTP), Andrew File System (AFS), Wireless Application Protocol (WAP), File Transfer Protocol (FTP), Network File System (NFS), an application program interface (API) based upon protocols such as SOAP, REST, etc. In an example where HTTP is used, one or more user electronic devices 580A-S might include an HTTP client, commonly referred to as a "browser," for sending and receiving HTTP messages to and from server(s) of system 540, thus allowing users 584 of the user electronic device 580A-S to access, process and view information, pages and applications available to it from system 540 over network 582.

Conclusion

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," "some implementations," "other implementations," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method comprising:
retrieving, from a first source of events, a first event that was published to the first source of events, wherein individual events are published to the first source of events to identify that respective records in a first database object have been updated, deleted, or inserted, wherein the first database object stores records relating to consent of a person, wherein the first event is associated with a first topic and includes first and second attributes; and
processing the first event, wherein the processing comprises, responsive to determining that a value of the first attribute of the first event indicates that a first field of a first record of the first database object stores an updated value that relates to consent:
storing, in a first attribute of an identifiable unit of data of a second event, an identifier for a second record in a second database object that stores records relating to consent, wherein the second record in the second database object relates to the first record;
storing, in a second attribute of the identifiable unit of data of the second event, the value of the second attribute of the first event as the updated value, wherein the presence of the second attribute in the identifiable unit of data of the second event indicates that the second event includes a change in a consent status of the person;
storing, in a third attribute of the identifiable unit of data of the second event based on one or more values of a plurality of attributes of the first event, one or more identifiers and one or more respective values of fields of the first record that were updated and that are different from the first field; and
publishing the second event to a second source of events.

2. The method of claim 1, wherein the processing the first event further comprises, responsive to determining that the value of the first attribute of the first event indicates that the first record was inserted in the first database object:
storing, in a first attribute of a third event, the identifier for the second record,
storing, in a second attribute of the third event based on one or more values of the plurality of attributes of the first event, the one or more identifiers and one or more respective values of fields of the first record, and
publishing the third event to the second source of events.

3. The method of claim 2, wherein the processing the first event further comprises, responsive to determining that the value of the first attribute of the first event indicates that the first record was deleted:
storing, in a first attribute of a fourth event, the identifier for the second record, and
publishing the fourth event to the second source of events.

4. The method of claim 1, further comprising:
determining the first topic of the retrieved first event; and
determining that the first topic indicates that the first event relates to the first database object,
wherein the processing the first event is performed responsive to determining that the first topic indicates that the first event relates to the first database object.

5. The method of claim 1, wherein the determining that the value of the first attribute of the first event indicates that the first field of the first record stores the updated value includes:
   determining that a value of a third attribute of the first event indicates that the first record was updated.

6. The method of claim 1,
   wherein the second event is associated with a second topic that is common to events published to the second source of events responsive to processing events retrieved from the first source of events.

7. The method of claim 6,
   wherein one or more consumers are to subscribe to the first topic to receive events published to the first source of events, which reflect changes to the first database object, and
   wherein the one or more consumers are to subscribe to the second topic to receive events published to the second source of events, which reflect changes relating to consent in the first and second database objects.

8. The method of claim 1, wherein the storing, in a third attribute of the identifiable unit of data of the second event, an identifier for a second record further comprises:
   retrieving, from a database that includes the second database object, the identifier for the second record based on a key that is shared between the first and second records and that identifies records that relate to the person.

9. The method of claim 1, wherein a name of the first attribute of the first event is based on a name of the first field of the first record, and wherein the name of the first field of the first record indicates that the updated value relates to consent.

10. The method of claim 1, wherein the one or more respective values that were stored in the third attribute of the second event each relate to consent.

11. The method of claim 1, wherein the first and second sources of events are different, and wherein the second event includes data which is not included in the first event.

12. A non-transitory machine-readable medium that stores instructions that, when executed by a processor, are capable of causing the processor to perform operations comprising:
   retrieving, from a first source of events, a first event that was published to the first source of events, wherein individual events are published to the first source of events to identify that respective records in a first database object have been updated, deleted, or inserted, wherein the first database object stores records relating to consent of a person, wherein the first event is associated with a first topic and includes first and second attributes;
   processing the first event, wherein the processing comprises, responsive to determining that a value of the first attribute of the first event indicates that a first field of a first record of the first database object stores an updated value that relates to consent:
      storing, based on a value of the second attribute of the first event, the updated value in a first attribute of an identifiable unit of data of a second event, wherein the presence of the first attribute in the identifiable unit of data of the second event indicates that the second event includes a change in a consent status of the person;
      storing, in a second attribute of the identifiable unit of data of the second event based on one or more values of a plurality of attributes of the first event, one or more identifiers and one or more respective values of fields of the first record that were updated and that are different from the first field; and
      storing, in a third attribute of the identifiable unit of data of the second event, an identifier for a second record in a second database object that stores records relating to consent, wherein the second record in the second database object relates to the first record; and
   publishing the second event to a second source of events.

13. The non-transitory machine-readable medium of claim 12, wherein the processing the first event further comprises, responsive to determining that the value of the first attribute of the first event indicates that the first record was inserted in the first database object:
   storing, in a first attribute of a third event based on one or more values of the plurality of attributes of the first event, the one or more identifiers and one or more respective values of fields of the first record, and
   storing, in a second attribute of the third event, the identifier for the second record; and
   publishing the third event to the second source of events.

14. The non-transitory machine-readable medium of claim 13, wherein the processing the first event further comprises, responsive to determining that the value of the first attribute of the first event indicates that the first record was deleted:
   storing, in a first attribute of a fourth event, the identifier for the second record; and
   publishing the fourth event to the second source of events.

15. The non-transitory machine-readable medium of claim 12, wherein the operations further comprise:
   determining the first topic of the retrieved first event; and
   determining that the first topic indicates that the first event relates to the first database object,
   wherein the processing the first event is performed responsive to determining that the first topic indicates that the first event relates to the first database object.

16. The non-transitory machine-readable medium of claim 12, wherein the determining that the value of the first attribute of the first event indicates that the first field of the first record stores the updated value includes:
   determining that a value of a third attribute of the first event indicates that the first record was updated.

17. The non-transitory machine-readable medium of claim 12,
   wherein the second event is associated with a second topic that is common to events published to the second source of events responsive to processing events retrieved from the first source of events.

18. The non-transitory machine-readable medium of claim 17,
   wherein one or more consumers are to subscribe to the first topic to receive events published to the first source of events, which reflect changes to the first database object, and
   wherein one or more consumers are to subscribe to the second topic to receive events published to the second source of events, which reflect changes relating to consent in the first and second database objects.

19. The non-transitory machine-readable medium of claim 12, wherein the storing, in a third attribute of the second event, an identifier for a second record further comprises:
   retrieving, from a database that includes the second database object, the identifier for the second record based on a key that is shared between the first and second records and that identifies records that relate to the person.

20. The non-transitory machine-readable medium of claim 12, wherein a name of the first attribute of the first event is based on a name of the first field of the first record, and wherein the name of the first field of the first record indicates that the updated value relates to consent.

21. The non-transitory machine-readable medium of claim 12, wherein the one or more respective values that were stored in the second attribute of the second event each relate to consent.

22. The non-transitory machine-readable medium of claim 12, wherein the first and second sources of events are different, and wherein the second event includes data which is not included in the first event.

\* \* \* \* \*